(12) United States Patent
Xie

(10) Patent No.: US 12,115,448 B2
(45) Date of Patent: Oct. 15, 2024

(54) METHOD AND APPARATUS FOR CONTROLLING CURSOR CONTROL, AND RELATED DEVICE

(71) Applicant: Tencent Technology (Shenzhen) Company Limited, Shenzhen (CN)

(72) Inventor: Zongxiang Xie, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 306 days.

(21) Appl. No.: 17/706,392

(22) Filed: Mar. 28, 2022

(65) Prior Publication Data

US 2022/0212102 A1 Jul. 7, 2022

Related U.S. Application Data

(63) Continuation of application No. PCT/CN2021/092024, filed on May 7, 2021.

(30) Foreign Application Priority Data

Jun. 5, 2020 (CN) .......................... 202010506388.8

(51) Int. Cl.
*A63F 13/42* (2014.01)
*G06F 3/04812* (2022.01)

(52) U.S. Cl.
CPC .......... *A63F 13/42* (2014.09); *G06F 3/04812* (2013.01); *A63F 2300/6045* (2013.01)

(58) Field of Classification Search
CPC .......... A63F 13/22; A63F 13/24; A63F 13/42; A63F 13/426; A63F 2300/6045; G06F 3/0338; G06F 3/04812
See application file for complete search history.

(56) References Cited

U.S. PATENT DOCUMENTS 7,629,961 B2 * 12/2009 Casebolt ............... G06F 3/0317
345/166
8,133,119 B2 * 3/2012 Finocchio ............... A63F 13/45
463/40
(Continued)

FOREIGN PATENT DOCUMENTS

CN 107391005 A 11/2017
CN 206649484 U 11/2017
(Continued)

OTHER PUBLICATIONS

Tencent Technology, Extended European Search Report, EP21818524.7, Dec. 2, 2022, 11 pgs.
(Continued)

*Primary Examiner* — James S. McClellan
*Assistant Examiner* — Ross A Williams
(74) *Attorney, Agent, or Firm* — Morgan, Lewis & Bockius LLP

(57) ABSTRACT

The present disclosure provides a method and apparatus for controlling a cursor control, and a related device. The method includes: obtaining an actual offset value of a target stick in an stick coordinate system from a game controller, the game controller being used for controlling a target cursor control in a target device; determining an adjusted offset value of the target stick in the stick coordinate system at a first moment according to the actual offset value; determining a first position of the target cursor control in a target device coordinate system at the first moment according to the adjusted offset value at the first moment; and transmitting the first position to the target device to control the target cursor control to move from a second position in the target device coordinate system at a second moment to the first position, a movement speed of the target cursor control from (Continued)

the second position to the first position being positively correlated with the adjusted offset value at the first moment.

17 Claims, 10 Drawing Sheets

(56) References Cited

U.S. PATENT DOCUMENTS

| | | | | |
|---|---|---|---|---|
| 8,730,166 | B2 * | 5/2014 | Larsen | A63F 13/24 |
| | | | | 345/157 |
| 9,910,512 | B1 | 3/2018 | Tiwary et al. | |
| 10,543,427 | B2 * | 1/2020 | Miller | A63F 13/42 |
| 2002/0047830 | A1 | 4/2002 | Philipson | |
| 2006/0254361 | A1 | 11/2006 | Douglas | |
| 2022/0262045 | A1 * | 8/2022 | Baidya | G06T 11/001 |

FOREIGN PATENT DOCUMENTS

| | | |
|---|---|---|
| CN | 110851056 A | 2/2020 |
| CN | 111665940 A | 9/2020 |
| JP | 2001195182 A | 7/2001 |
| JP | 2004348604 A | 12/2004 |
| JP | 2006263007 A | 10/2006 |
| JP | 2007004571 A | 1/2007 |
| JP | 2007334737 A | 12/2007 |
| JP | 2008515042 A | 5/2008 |
| JP | 2012050578 A | 3/2012 |
| WO | WO 92/09982 A1 | 6/1992 |

OTHER PUBLICATIONS

Tencent Technology, WO, PCT/CN2021/092024, Jun. 30, 2021, 5 pgs.
Tencent Technology, IPRP, PCT/CN2021/092024, Dec. 6, 2022, 6 pgs.
Tencent Technology, Japanese Office Action, JP Patent Application No. 2022-558170, Nov. 28, 2023, 7pgs.
Tencent Technology, ISR, PCT/CN2021/092024, Jun. 30, 2021, 2 pgs.

* cited by examiner

METHOD AND APPARATUS FOR CONTROLLING CURSOR CONTROL, AND RELATED DEVICE

CROSS-REFERENCE TO RELATED APPLICATIONS

This application is a continuation application of PCT Patent Application No. PCT/CN2021/092024, entitled "METHOD AND APPARATUS FOR CONTROLLING CURSOR CONTROL, AND RELATED DEVICE" filed on May 7, 2021, which claims priority to Chinese Patent Application No. 202010506388.8, filed with the State Intellectual Property Office of the People's Republic of China on Jun. 5, 2020, and entitled "METHOD AND APPARATUS FOR CONTROLLING CURSOR CONTROL, AND RELATED DEVICE", all of which are incorporated herein by reference in their entirety.

FIELD OF THE TECHNOLOGY

The present disclosure relates to the field of data processing technologies, and in particular, to the technology of controlling cursor controls.

BACKGROUND OF THE DISCLOSURE

A TV game is a game played through a TV terminal. TV games are more and more popular among gamers because of the large size, bright color, and clear picture of TV screens.

However, because a mouse or a keyboard cannot be used on a TV terminal, nor a touch-screen operation can be performed thereon, users have not good experiences of playing games through the TV terminal.

In the related art, game players often use a gamepad as an input device to control a cursor control, to move a cursor or simulate finger touch and tap. However, in the related art, the control of the cursor control by the game controller is not flexible enough, which in turn affects the accuracy, resulting in poor game experience for players.

Therefore, it is crucial for improving user experience to provide a method for flexibly controlling a cursor control through a gamepad.

It is to be noted that the information disclosed in the foregoing background part is used only for enhancing the understanding of the background of the present disclosure, and therefore may include information that does not constitute the related art known to a person of ordinary skill in the art.

SUMMARY

Embodiments of the present disclosure provide a method and apparatus for controlling a cursor control, and a related device, which can precisely control a movement speed of a target cursor control through a target stick of a game controller, thereby improving the control accuracy.

Other features and advantages of the present disclosure will be apparent through the following detailed description, or partly learned through practice of the present disclosure.

An embodiment of the present disclosure provides a method for controlling a target cursor control on a display, performed by an electronic device, wherein the electronic device is communicatively connected to the display and a game controller, respectively, including: obtaining, from the game controller, an actual offset value of a target stick in a stick coordinate system associated with the game controller; determining an adjusted offset value of the target stick in the stick coordinate system at a first moment according to the actual offset value; determining a first position of the target cursor control in a target device coordinate system associated with the display at the first moment according to the adjusted offset value of the target stick in the stick coordinate system at the first moment; and controlling the target cursor control to move from a second position in the target device coordinate system at a second moment to the first position, the second moment being a moment before the first moment, a movement speed of the target cursor control from the second position to the first position being positively correlated with the adjusted offset value of the target stick in the stick coordinate system at the first moment.

In some embodiments, the actual offset value of the target stick of the game controller in the stick coordinate system is an actual offset value corresponding to a moment closest to the first moment.

In some embodiments, the adjusted offset value of the target stick in the stick coordinate system is a maximum adjusted offset value, and the actual offset value corresponding to the moment closest to the first moment is a maximum actual offset value.

An embodiment of the present disclosure provides an electronic device that is communicatively connected to a display and a game controller, respectively, the electronic device including: one or more processors; and a storage apparatus, configured to store one or more programs, the one or more programs, when executed by the one or more processors, causing the one or more processors to implement the foregoing method for controlling a cursor control on the display.

An embodiment of the present disclosure provides a non-transitory computer-readable storage medium, storing one or more computer programs, the computer programs, when executed by a processor of an electronic device that is communicatively connected to a display and a game controller, respectively, causing the electronic device to perform a method for controlling a target cursor control on the display.

The embodiments of the present disclosure provide a method and apparatus for controlling a cursor control, and a related device. First, an adjusted offset value of a target stick at a first moment is determined through an actual offset value of the target stick, and then a target cursor control is controlled to move at different movement speeds according to different adjusted offset values, achieving the precise control of the movement speed and accuracy of the target cursor control, improving the operation flexibility of a game controller, and greatly reducing the impact of cursor simulation on the operation of players during game.

It is to be understood that the foregoing general descriptions and the following detailed descriptions are merely exemplary, and cannot limit the present disclosure.

BRIEF DESCRIPTION OF THE DRAWINGS

The accompanying drawings herein, which are incorporated in the specification as a part of the specification, show embodiments in accordance with the present disclosure, and together with the specification are used to explain the principle of the present disclosure. The accompanying drawings in the following description are merely some embodiments of the present disclosure, and a person of ordinary skill in the art may still derive other drawings from these accompanying drawings without creative efforts.

DESCRIPTION OF EMBODIMENTS

Figure 1:
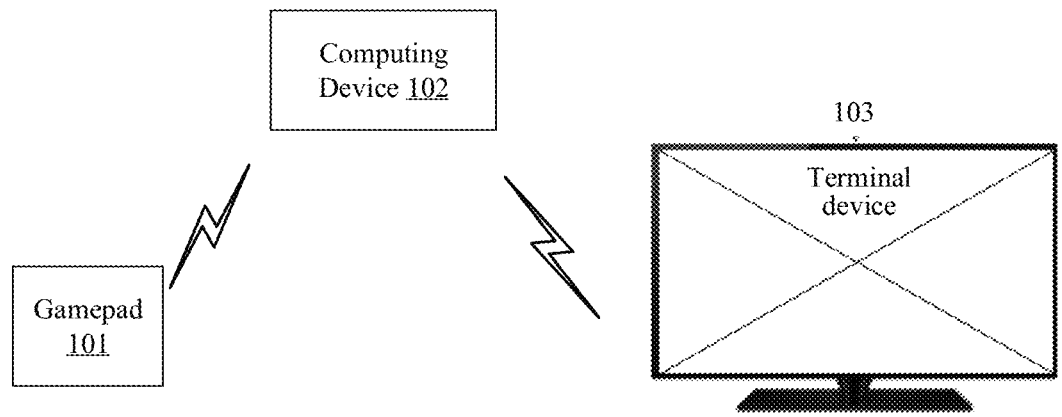
FIG. 1 is a schematic diagram of an application scenario of a method for controlling a cursor control or an apparatus for controlling a cursor control applied to embodiments of the present disclosure.

At present, the exemplary embodiments are described comprehensively with reference to the accompanying drawings. However, the exemplary embodiments can be implemented in various forms and are not to be understood as limited to embodiments described herein; on the contrary, providing these embodiments will make the present disclosure more comprehensive and complete, and comprehensively convey a concept of the exemplary embodiments to a person skilled in the art. The same reference numeral in the accompanying drawings represents same or similar components, and therefore repeated descriptions of the components are appropriately omitted.

The features, structures, or characteristics described in the present disclosure may be combined in one or more implementations in any appropriate manner. In the following descriptions, a lot of specific details are provided to give a comprehensive understanding of the implementations of the present disclosure. However, a person skilled in the art should be aware that, the technical solutions in the present disclosure may be implemented without one or more of the particular details, or another method, component, apparatus, or step may be used. In other cases, well-known methods, apparatuses, implementations, or operations are not shown or described in detail, in order not to obscure the aspects of the present disclosure.

The accompanying drawings are merely exemplary illustrations of the present disclosure. The same reference numeral in the accompanying drawings represents same or similar components, and therefore repeated descriptions of the components are appropriately omitted. Some block diagrams shown in the accompanying drawings do not necessarily correspond to physically or logically independent entities. The functional entities may be implemented in the form of software, or implemented in one or more hardware modules or integrated circuits, or implemented in different networks and/or processor apparatuses and/or micro-controller apparatuses.

The flowcharts shown in the accompanying drawings are merely exemplary descriptions and do not necessarily include all of the content and steps, nor are the flowcharts necessarily performed in the order described. For example, some steps may further be decomposed, and some steps may be merged or partially merged. As a result, an actual execution order may be changed according to an actual situation.

In this specification, the terms "a", "an", "the", "said", and "at least one" are used to indicate the presence of one or more elements/components; the terms "comprising", "including", and "having" are used to indicate an open-ended inclusive meaning and mean that there may be additional elements/components in addition to the listed elements/components; and the terms "first", "second", "third", and the like are used only as labels and are not intended to limit the number of objects.

The following describes the exemplary implementations of the present disclosure in detail with reference to the accompanying drawings.

FIG. 1 is a schematic diagram of an exemplary system architecture of a method for controlling a cursor control or an apparatus for controlling a cursor control applied to embodiments of the present disclosure.

As shown in FIG. 1, a system architecture 100 may include: a gamepad 101, a computing device 102, and a terminal device 103. The gamepad 101 may be in a network connection with the computing device 102 through a Bluetooth, a wireless receiver, or a wired receiver. The computing device 102 may be in a network connection with the TV terminal 103 through a wired circuit. This is not limited in the present disclosure. The network may include various connection types such as a wired or wireless communication link, or an optical fiber cable.

A user may interact with the computing device 102 by using the game controller 101 through the network connection, to receive or send messages. The computing device 102 may be any electronic device for computing services, including but not limited to a TV box, a smart TV, a smartphone, a tablet computer, a laptop, a desktop computer, a wearable device, a VR device, a smart home, and the like. The terminal device 103 may be any display device that needs a gamepad to control a cursor control, such as a TV, a computer, a smartphone, a notebook computer, a tablet computer, a laptop, a desktop computer, a wearable device, a VR device, a smart speaker, a smart watch, and a smart home.

In some embodiments, the computing device 102 and the terminal device 103 may be the same object, or may be different objects. This is not limited in the present disclosure. For example, because a smart TV can achieve both the computing function and the display function, the smart TV may be both the computing device 102 and the terminal device 103. This is not limited in the present disclosure.

The computing device 102 may be a server that provides various services, for example, a backend administration server supporting an apparatus operated by a user using the terminal device 103. The backend administration server can process data such as a received request, and feedback processing results to the terminal device.

The computing device 102 may, for example, obtain an actual offset value of a target stick in an stick coordinate system from a game controller, the game controller being used for controlling a target cursor control in a target device; the computing device 102 may, for example, determine an adjusted offset value of the target stick in the stick coordinate system at a first moment according to the actual offset value; the computing device 102 may, for example, determine a first position of the target cursor control in a target device coordinate system at the first moment according to the adjusted offset value at the first moment; and the computing device 102 may, for example, transmit the first position to the target device to control the target cursor control to move from a second position in the target device coordinate system at a second moment to the first position, the second moment being a moment before the first moment. A movement speed of the target cursor control from the second position to the first position is positively correlated with the adjusted offset value at the first moment.

It is to be understood that the quantities of terminal device, network, and server in FIG. 1 are merely exemplary. The computing device 102 may be an entity server, or may be composed of a plurality of servers. There may be any quantities of terminal device, network, and server according to actual requirements.

In some embodiments, a method for controlling a cursor control provided in the embodiments of the present disclosure may not only be implemented in the computing device 102 with an entity, but may also be implemented through the function of cloud computing provided by a cloud service. This is not limited in the present disclosure.

In the embodiments of the present disclosure, the computing device 102 may be an independent physical device (such as a TV box and a physical server), or may be a device cluster or a distributed system including a plurality of physical devices, or may be a cloud server that provides cloud computing services. This is not limited in this application.

Cloud computing is a computing mode, in which computing tasks are distributed on a resource pool formed by a large quantity of computers, so that various application systems can obtain computing power, storage space, and information services according to requirements. A network that provides resources is referred to as a "cloud". For a user, resources in a "cloud" seem to be infinitely expandable, and can be obtained readily, used on demand, expanded readily, and paid according to usage.

As a basic capability provider of cloud computing, a cloud computing resource pool (referred to as cloud platform for short, generally called Infrastructure as a Service (IaaS) platform) will be established. Various types of virtual resources are deployed in the resource pool for external customers to choose and use. The cloud computing resource pool mainly includes: a computing device (a virtualized machine including an operating system), a storage device, and a network device.

According to the division of logical functions, the Platform as a Service (PaaS) layer may be deployed on the IaaS player, and the Software as a Service (SaaS) layer may be deployed on the PaaS layer, or the SaaS layer may be directly deployed on the IaaS player. PaaS is a platform on which software runs, such as a database and a web container. SaaS is a variety of business software, such as a web portal and an SMS group sender. Generally, SaaS and PaaS are upper layers relative to IaaS.

Figure 2:
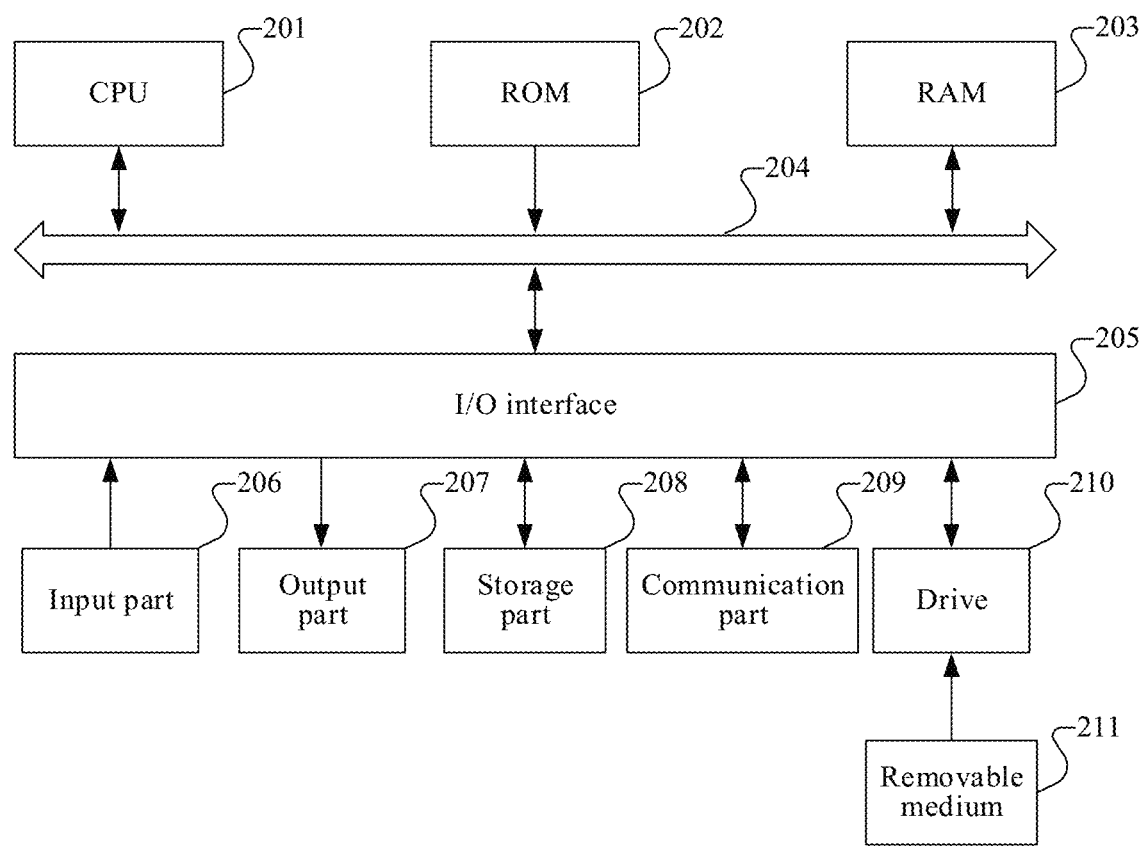
FIG. 2 is a schematic structural diagram of a computer system applied to an apparatus for controlling a cursor control according to an exemplary embodiment.

FIG. 2 is a schematic structural diagram of a computer system 200 adapted to implement a terminal device according to an embodiment of this application. The terminal device shown in FIG. 2 is merely an example, and does not impose any limitation on the functions and scope of use of the embodiments of this application.

As shown in FIG. 2, the computer system 200 includes a central processing unit (CPU) 201, which can perform various appropriate actions and processing according to a program stored in a read-only memory (ROM) 202 or a program loaded into a random access memory (RAM) 203 from a storage part 208. The RAM 203 further stores various programs and data required for operations of the system 200. The CPU 201, the ROM 202, and the RAM 203 are connected to each other through a bus 204. An input/output (I/O) interface 205 is also connected to the bus 204.

The following components are connected to the I/O interface 205: an input part 206 including a keyboard, a mouse, or the like; an output part 207 including a cathode ray tube (CRT), a liquid crystal display (LCD), a speaker, or the like; a storage part 208 including a hard disk or the like; and a communication part 209 of a network interface card, including a LAN card, a modem, or the like. The communication portion 209 performs communication processing by using a network such as the Internet. A driver 210 is also connected to the I/O interface 205 as required. A removable medium 211, such as a magnetic disk, an optical disc, a magneto-optical disk, or a semiconductor memory, is installed on the drive 210 as required, so that a computer program read from the removable medium is installed into the storage part 208 as required.

In particular, according to the embodiments of the present disclosure, the processes described above with reference to the flowchart may be implemented as a computer software program. For example, an embodiment of the present disclosure includes a computer program product, including a computer program carried on a computer-readable medium. The computer program includes program code for performing the method shown in the flowchart. In such an embodiment, the computer program may be downloaded and installed from the network through the communication portion 209, and/or installed from the removable medium 211. The computer program, when executed by the CPU 201, performs the foregoing functions defined in the system of this application.

It is to be noted that the computer-readable storage medium according to this application may be a computer-readable signal medium or a computer-readable storage medium or any combination of the two media. The computer-readable storage medium may be, for example, but is not limited to, an electric, magnetic, optical, electromagnetic, infrared, or semi-conductive system, apparatus, or component, or any combination thereof. A more specific example of the computer-readable storage medium may include, but is not limited to: an electrical connection with one or more wires, a portable computer disk, a hard disk, a random access memory (RAM), a read-only memory (ROM), an erasable programmable read-only memory (EPROM or a flash memory), an optical fiber, a portable compact disc read-only memory (CD-ROM), an optical storage device, a magnetic storage device, or any suitable combination thereof. In this application, the computer-readable storage medium may be any tangible medium containing or storing a program, and the program may be used by or used in combination with an instruction execution system, an apparatus, or a device. In this application, a computer-readable signal medium may include a data signal being in a baseband or propagated as a part of a carrier wave, the data signal carrying computer-readable program code. Such a propagated data signal may be in a plurality of forms, including but not limited to an electromagnetic signal, an optical signal, or any suitable combination thereof. The computer-readable signal medium may alternatively be any computer-readable storage medium other than the computer-readable storage medium. The computer-readable storage medium may send, propagate, or transmit a program for use by or in combination with an instruction execution system, apparatus, or device. The program code contained in the computer-readable storage medium may be transmitted by using any appropriate medium, including but not limited to: a wireless medium, a wire, an optical cable, RF, any suitable combination thereof, or the like.

The flowcharts and block diagrams in the accompanying drawings illustrate possible system architectures, functions, and operations that may be implemented by a system, a method, and a computer program product according to various embodiments of this application. In this regard, each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. It should also be noted that, each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

Related modules and/or submodules and/or units described in the embodiments of this application may be implemented in a software manner, or may be implemented in a hardware manner. The described modules and/or submodules and/or units may be set in a processor, which, for example, may be described as: a processor including a transmitting unit, an obtaining unit, a determining unit, and a first processing unit. Names of the modules and/or submodules and/or units do not constitute a limitation on the modules and/or submodules and/or units in a specific case.

According to another aspect, this application further provides a computer-readable storage medium. The computer-readable storage medium may be included in the device described in the foregoing embodiments, or may exist alone and be not assembled in the device. The computer-readable storage medium carries one or more programs. When the one or more programs are executed by a device, the device can implement the functions including: obtaining an actual offset value of a target stick in an stick coordinate system from a game controller, the game controller being used for controlling a target cursor control in a target device; determining an adjusted offset value of the target stick in the stick coordinate system at a first moment according to the actual offset value; determining a first position of the target cursor control in a target device coordinate system at the first moment according to the adjusted offset value at the first moment; and transmitting the first position to the target device to control the target cursor control to move from a second position in the target device coordinate system at a second moment to the first position, a movement speed of the target cursor control from the second position to the first position being positively correlated with the adjusted offset value at the first moment.

Cloud gaming, also known as gaming on demand, is an online gaming technology based on cloud computing technology. Cloud gaming technology enables thin clients with relatively limited graphics processing and data computing capabilities to run high-quality games. In a scenario of cloud gaming, a game is not run on a player game terminal, but is run on a cloud server, and a game scene is rendered into a video and audio stream by the cloud server and transmitted to the player game terminal through network. The player game terminal does not need to have powerful graphics computing and data processing capabilities, but only needs to have a basic streaming media playback capability and a capability of obtaining an input instruction from a player and transmitting the input instruction to the cloud server.

To improve gaming experience, game players usually choose TV terminals for cloud gaming.

In the related art, because a mouse or a keyboard cannot be used on a TV terminal, nor a touch-screen operation can be performed thereon, players usually use a gamepad as an input device to control a cursor control in the TV terminal.

As shown in FIG. 1, a player may connect the game controller 101 to the computing device 102 (for example, a TV box) through a Bluetooth or a universal serial bus (USB) wireless receiver for the computing device 102 to receive an actual offset value of a target stick uploaded by the game controller 101. The TV box is a small computing terminal device that can play Internet content on a TV.

In some embodiments, a cursor control of cloud gaming in a terminal device may be controlled by a gamepad through the following steps.

Figure 3:
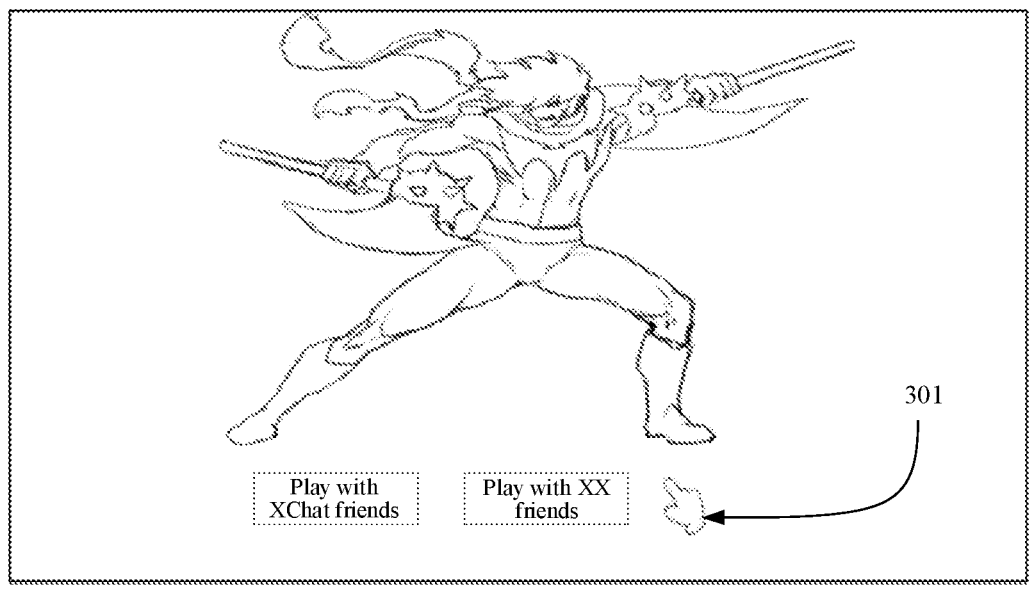
FIG. 3 is a schematic diagram of a target cursor control according to an exemplary embodiment.
Figure 4:
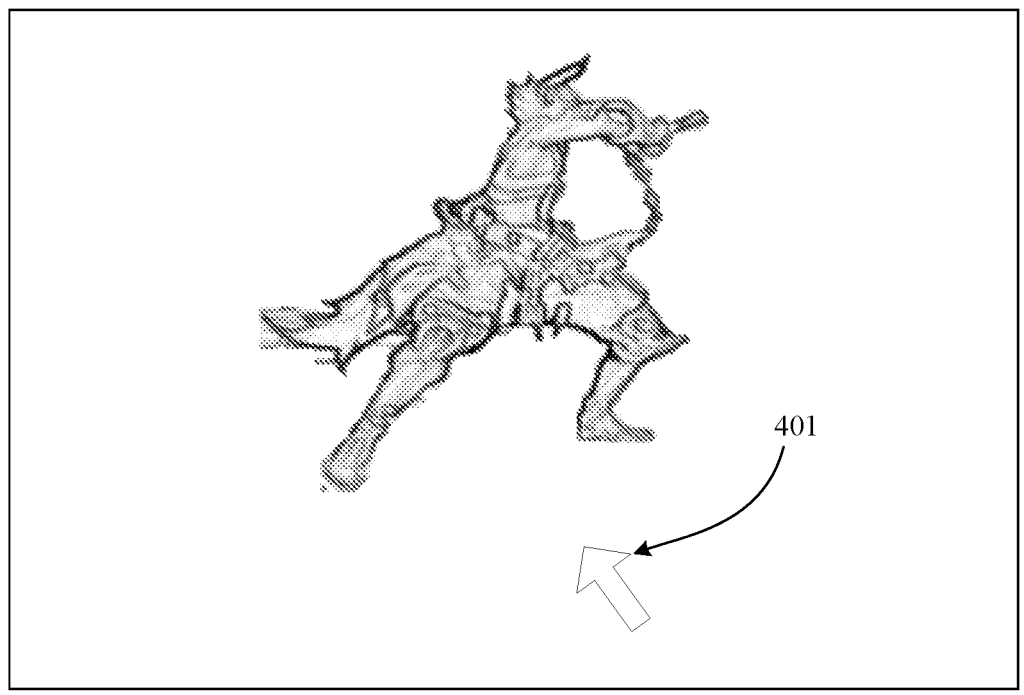
FIG. 4 is a schematic diagram of a target cursor control according to an exemplary embodiment.

A cloud gaming application client is installed on the computing device 102 (such as a smart TV or a TV box) shown in FIG. 1; a user enters an application lobby of the TV box, runs the cloud gaming client, and enters a cloud gaming scene to start a game; the game controller 101 is connected to a device monitoring module of the cloud gaming client through a Bluetooth or a USB wireless receiver; and during the running of the target cloud game, that is, during the display of the scene of the target cloud game, a target operation key of the game controller 101 may be pressed and immediately released to switch the game mode, for example, the direct switch between a key mapping mode and a mouse mode may be controlled through a right joystick to display a customized cursor control 301 shown in FIG. 3 or a customized cursor control 401 shown in FIG. 4 in the terminal device 103, in this case, the customized cursor control 301 or the customized cursor control 401 may be referred to as a target cursor control. A player may control the game controller 101 to control the customized cursor control, for example, a cursor control may be controlled to move through a right joystick (that is, a target stick) of the game controller 101, and the cursor control may be controlled to perform a click operation through a key A of the game controller 101. It can be understood that the functions of the key A and the right joystick can be set by game developers in advance (in other words, which stick controls the movement of the cursor control and which key controls the click of the cursor control can be set by game developers in advance).

However, the control of the cursor control through the game controller in the related art generally has the following defects:

1. The change of the stick on the game controller is not linear (for example, the movement speed is not linear), and the signal that triggers the game controller to upload data is not fixed (it may be that the game controller is triggered to upload data when the stick reaches a specific position, or it may be that the game controller is randomly triggered to upload a shake change value, and in short, the game controller does not upload the shake change value of the stick according to a fixed time or a fixed position). As a result, when the stick is shaken from a static position to a maximum position, the number of times the game controller reports the change value may be very small or very large, and the change value may be very rare or very intensive. In the end, the movement of the cursor does not coincide with the change of the stick of the game controller.

2. The stick of the game controller reports the change value only when it is continuously shaken, and the game controller does not report the change value when it is still at the maximum shaking position.
3. The stick of the game controller only has an operation of change range, but no operation of change speed, which is not in line with the operation of mouse movement, resulting in a bad experience to users.

Therefore, in the related art, the control of the cursor control through the game controller can neither achieve the click on any position at any time like the control of a touch screen, nor make the movement speed and accuracy of the cursor control controllable like the control of a real mouse.

To resolve the foregoing problems, the embodiments of the present disclosure provide the following technical solutions.

Figure 5:
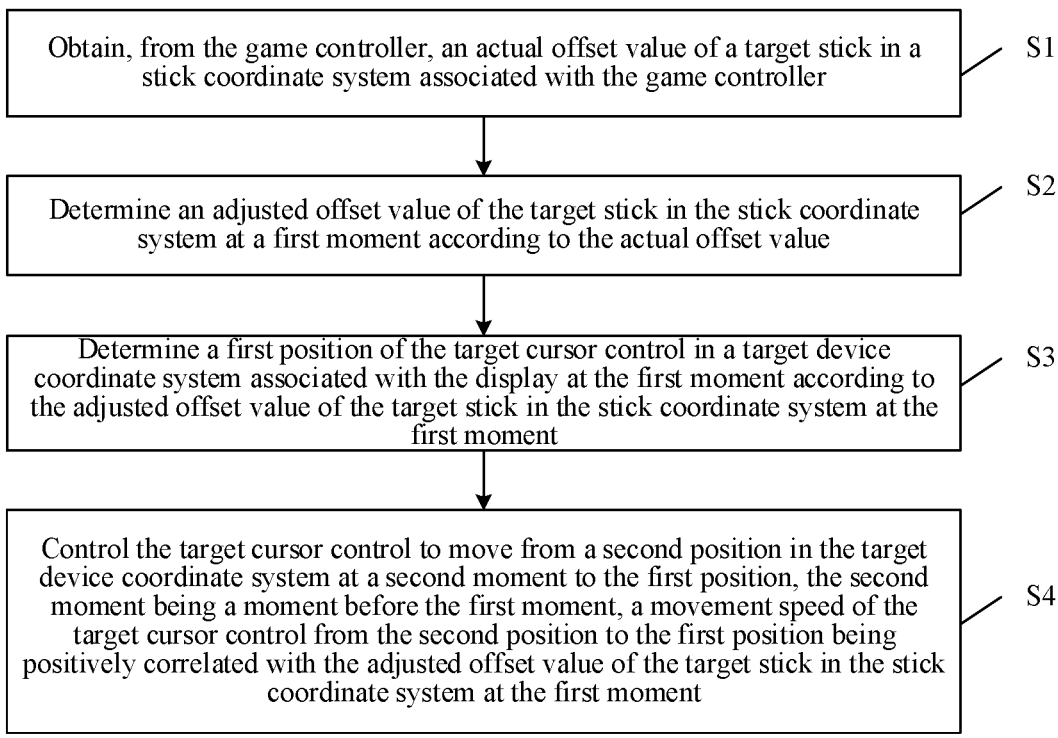
FIG. 5 is a flowchart of a method for controlling a cursor control according to an exemplary embodiment.

FIG. 5 is a flowchart of a method for controlling a cursor control according to an exemplary embodiment. The method provided in this embodiment of the present disclosure may be processed by any electronic device with a computing and processing capability, such as the computing device 102 and/or the terminal device 103 in the embodiment of FIG. 1. In the following embodiment, that the computing device 102 is used as an execution entity is used as an example for description, but the present disclosure is not limited thereto.

Referring to FIG. 5, the method for controlling a cursor control provided in this embodiment of the present disclosure may include the following steps.

Step S1. Obtain an actual offset value of a target stick in an stick coordinate system from a game controller, the game controller being used for controlling a target cursor control in a target device.

In some embodiments, the game controller may be a gamepad shown in FIG. 1, the game controller may be used as the game controller, and the game controller may include a left joystick, a right joystick, a key A, and the like. It can be understood that different gamepads may include different keys and joysticks, and different keys and joysticks may include different functions. This is not limited in the present disclosure. The target device is a device that displays the target cursor control, and may be the terminal device 103 shown in FIG. 1.

In some embodiments, the game controller may include a plurality of joysticks, where a joystick that can be used to control the target cursor control is the target stick.

In this embodiment of the present disclosure, the game controller may be a gamepad that can control the target cursor control through the target stick.

In some embodiments, the stick coordinate system may be constructed with the center position of the target stick as the origin and with any two mutually perpendicular directions as the X-axis and the Y-axis. For the convenience of operation, the up-down direction and the left-right direction are generally used as the X-axis and the Y-axis, respectively. This is not limited in the present disclosure.

In some embodiments, a value of the target stick offset from the origin is used as the actual offset value of the target stick in the stick coordinate system.

Generally, the actual offset value may be acquired by the game controller and transmitted to the computing device (for example, a TV box) shown in FIG. 1.

In some embodiments, the actual offset value uploaded by the game controller is generally a normalized offset value with a change range of [−1, 1]. This is not limited in the present disclosure.

It can be understood that, because the game controller does not acquire the actual offset value of the target stick according to a fixed frequency or a fixed position (for example, the game controller acquires the actual offset value when the stick moves to a certain position), the target cursor control can neither move consistently with the target stick in real time, nor keep moving when the target stick stops at a certain position, which is quite different from the movement of a cursor control controlled by a mouse, resulting in poor user experience.

Step S2. Determine an adjusted offset value of the target stick in the stick coordinate system at a first moment according to the actual offset value.

In some embodiments, because a system of a TV box computing device is usually the Android system, how the computing device obtains the actual offset value is described in this embodiment using the Android system as an example.

When the target stick of the game controller moves, the game controller receives an instruction inputted by a player, and then transmits a MotionEvent instruction to the computing device. When the computing device receives the MotionEvent instruction, the Android system of the computing device uses the following program to obtain the axis change of the target stick, and uses AXIS to identify the change of the left-right direction (AXIS_X) and the up-down direction (AXIS_Y) of the target stick of the game controller with a change range of a floating-point number between −1.0 and 1.0 (including −1.0 and 1.0), where a larger absolute value indicates greater shaking of the target stick.

float axis_x=event. getAxis Value(MotionEvent.AXIS_X)//obtain a real offset change value in the horizontal axis direction float axis_y=event. getAxis Value(MotionEvent.AXIS_Y)//obtain a real offset change value in the vertical axis direction If an actual offset value in the horizontal axis direction or an actual offset value in the vertical axis direction of the target stick is greater than a target threshold (for example, 0.005), it is considered that the target stick moves, and the actual offset value obtained this time is truly valid.

Whether an actual offset value of the horizontal/vertical axis is greater than the target threshold may be determined through the following steps.

The getFlat( ) function of the Android system is invoked to obtain a center position range of the target stick, and whether an actual offset value of the horizontal/vertical axis is greater than the target threshold is determined through the following code.

The pseudocode is as follows:

InputDevice.MotionRange range=
InputDevice.getMotionRange(MotionEvent.AXIS_X, event.getSource( ):/obta in a target threshold MotionRange preset for the horizontal axis float flat=range.getFlat( )//read a center position range in the left-right direction from the MotionRange in the left-right direction if (Math.abs(axis_x)>flat)//if the target stick moves beyond the range in the left-right direction, the target stick shakes in the left-right direction if (Math.abs(axis_y)>flat)//if the target stick moves beyond the range in the up-down direction, the target stick shakes in the up-down direction In some embodiments, the upload of the actual offset value by the game controller has an unfixed time point. If the target cursor control is controlled to move according to the actual offset value uploaded by the game controller, the following situations may occur: 1. If the acquisition time interval between a current actual offset value and a previous actual offset value is large, the target cursor control is out of control, and the movement of the target cursor control and the movement of the target stick cannot be consistent in real time. 2. When the target stick stops at an offset position, the game controller does not upload the actual offset value, and the game controller cannot control the target cursor control during this period.

In some embodiments, after the actual offset value is obtained, interpolation processing may be performed on the actual offset value according to a preset frequency to obtain an adjusted offset value, and then the target cursor control may be controlled to move according to the adjusted offset value obtained through interpolation, so that the movement of the target cursor control and the movement of the target stick is consistent in real time, and the target cursor control can continue to move when the target stick stops at a certain offset position. The adjusted offset value may refer to a possible offset value of the target stick relative to the center of the stick at a target time point (an interpolation time point) after performing an interpolation operation on the actual offset value.

In some embodiments, the preset frequency may be set according to actual requirements, for example, the preset frequency may be preset to 50 ms each time.

Step S3. Determine a first position of the target cursor control in a target device coordinate system at the first moment according to the adjusted offset value at the first moment.

In some embodiments, a coordinate conversion coefficient may be preset, and the adjusted offset value of the target stick in the stick coordinate system may be converted into the target device coordinate system, to determine a movement offset value of the target cursor control in the target device coordinate system; and then the first position of the target cursor control at the first moment is determined according to a second position of the target cursor control at a second moment and the movement offset value of the target cursor control in the target device coordinate system. The movement offset value of the target cursor control in the target device coordinate system may refer to an offset value of the target cursor control at the first position relative to the second position in the target device coordinate system.

For example, assuming that the coordinate conversion coefficient is 30 pixels and the adjusted offset value of the target stick in the stick coordinate system at the first moment is 0.5, then the movement offset value of the target cursor control in the target device coordinate system may be set to 0.5*30 pixels, that is, the target cursor control may move 15 pixels in the target device coordinate system.

In some embodiments, to better simulate the effect of mouse movement, in this embodiment, different coordinate conversion coefficients may be set for different adjusted offset values. For example, a large coordinate conversion coefficient is set for a large adjusted offset value, and a small coordinate conversion coefficient is set for a small adjusted offset value, so that it can be ensured that, within a fixed time, the faster the target stick moves (the larger the movement distance is within a fixed time), the faster the target cursor control moves correspondingly.

Step S4. Transmit the first position to the target device to control the target cursor control to move from a second position in the target device coordinate system at a second moment to the first position, the second moment being a moment before the first moment, a movement speed of the target cursor control from the second position to the first position being positively correlated with the adjusted offset value at the first moment.

In the technical solution provided by this embodiment, the adjusted offset value of the target stick is determined by the actual offset value of the target stick, and then the target cursor control is controlled to move at different speeds according to different adjusted offset values. The method provided in this embodiment ensures that a movement speed of the target cursor control is positively correlated with a movement speed of the target stick, and can not only control the movement speed of the target cursor control through the target stick, but also control the movement precision of the target cursor control through the target stick, thereby improving the user experience.

Figure 6:
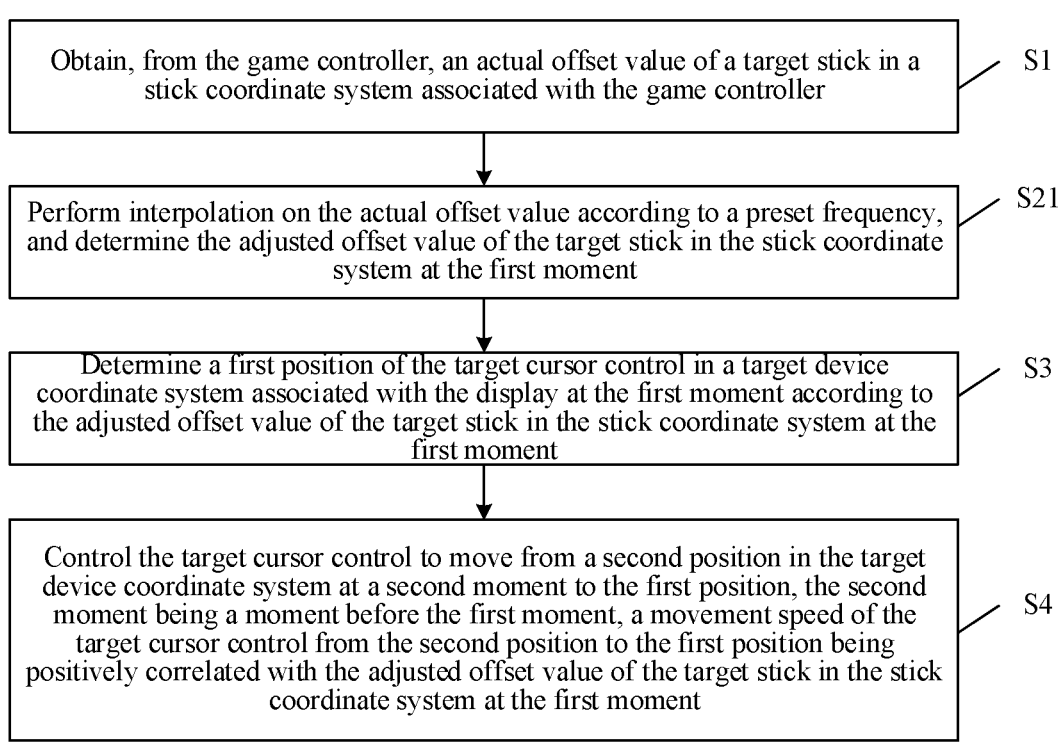
FIG. 6 is a flowchart of a method for controlling a cursor control according to an exemplary embodiment.

FIG. 6 is a flowchart of a method for controlling a cursor control according to an exemplary embodiment. Referring to FIG. 6, the method for controlling a cursor control may include the following steps.

Step S1. Obtain an actual offset value of a target stick in an stick coordinate system from a game controller, the game controller being used for controlling a target cursor control in a target device.

Step S21. Perform interpolation processing on the actual offset value according to a preset frequency, and determine the adjusted offset value of the target stick in the stick coordinate system at the first moment.

In some embodiments, the actual offset value may be interpolated by different interpolation methods such as one-dimensional interpolation and two-dimensional interpolation. This is not limited in the present disclosure.

Step S3. Determine a first position of the target cursor control in a target device coordinate system at the first moment according to the adjusted offset value at the first moment.

Step S4. Transmit the first position to the target device to control the target cursor control to move from a second position in the target device coordinate system at a second moment to the first position, a movement speed of the target cursor control from the second position to the first position being positively correlated with the adjusted offset value at the first moment.

In the technical solution provided by this embodiment, the actual offset value is interpolated through the preset frequency to obtain the adjusted offset value, and the target cursor control is controlled based on the adjusted offset value, which can not only ensure that the target cursor control can move in real time according to the movement of the target stick (that is, the target cursor control is controlled to move according to the adjusted offset value at regular intervals), but also ensure the smoothness of the movement of the target cursor control (that is, there is no large deviation between a speed at the first moment and a speed at the second moment).

Figure 7:
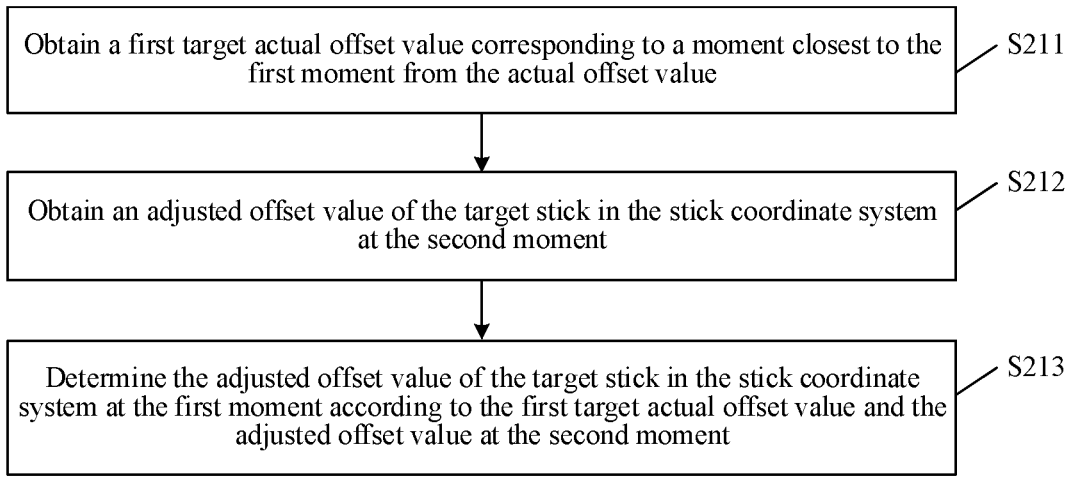
FIG. 7 is a flowchart of step S21 in FIG. 6 according to an exemplary embodiment.

FIG. 7 is a flowchart of step S21 in FIG. 6 according to an exemplary embodiment. Referring to FIG. 7, step S21 may include the following steps.

Step S211. Obtain a first target actual offset value corresponding to a moment closest to the first moment from the actual offset value.

In some embodiments, the first target actual offset value $X_t$ corresponding to a moment closest to the first moment k may be obtained from the actual offset value, i being a positive integer greater than or equal to 1.

Step S212. Obtain an adjusted offset value of the target stick in the stick coordinate system at the second moment.

In some embodiments, the adjusted offset value $X'_{k-1}$ of the target stick at the second moment may be obtained. If there is no adjusted offset value at the second moment, $X'_{k-1}$ may be set equal to the first target actual offset value $X_i$.

Step S213. Determine the adjusted offset value of the target stick in the stick coordinate system at the first moment according to the first target actual offset value and the adjusted offset value at the second moment.

In some embodiments, the adjusted offset value $X'_{k-1}$ of the target stick at the second moment and the first target actual offset value $X_t$ may be averaged to determine the adjusted offset value $X'_k$ at the first moment (that is, $X'_k = (X'_{k-1} + X_i)/2$), or a median of the adjusted offset value $X'_{k-1}$ of the target stick at the second moment and the first target actual offset value $X_i$ may be calculated to determine the adjusted offset value $X'_k$ at the first moment. This is not limited in the present disclosure.

It can be understood that the actual offset value may alternatively be interpolated by other methods (such as monomial interpolation and Lagrange interpolation). This is not limited in the present disclosure.

In the technical solution provided by this embodiment, the actual offset value is interpolated according to the first target actual offset value and the adjusted offset value at the second moment to obtain the adjusted offset value at the first moment. It not only ensures that the adjusted offset value at the first moment is not significantly offset from the adjusted offset value at the second moment, but also ensures that there is no large error between the adjusted offset value at the first moment and the first target actual offset value, which is more in line with the offset of the target stick at the first moment.

In some embodiments, a second target actual offset value corresponding to a moment closest to the first moment may be obtained from the actual offset value, and the second target actual offset value may be directly used as the adjusted offset value of the target stick in the stick coordinate system at the first moment.

Figure 8:
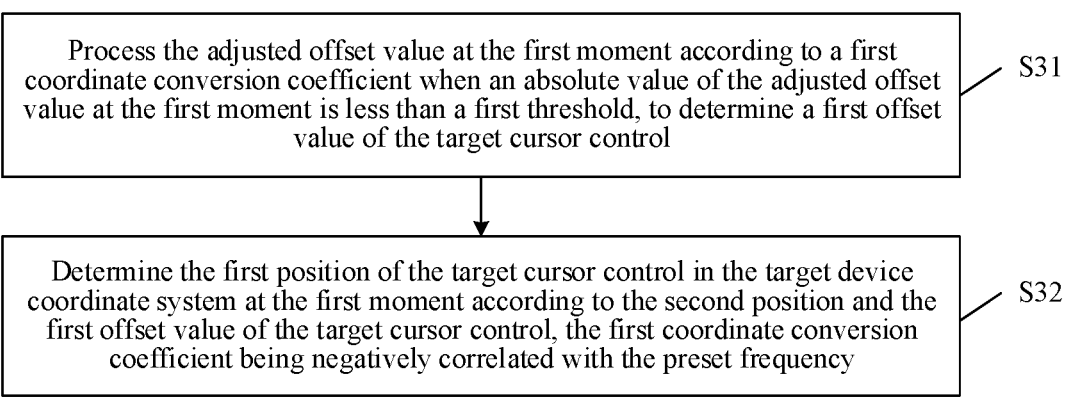
FIG. 8 is a flowchart of step S3 in FIG. 6 according to an exemplary embodiment.

FIG. 8 is a flowchart of step S3 in FIG. 6 according to an exemplary embodiment. Referring to FIG. 8, step S3 may include the following steps.

Step S31. Process the adjusted offset value at the first moment according to a first coordinate conversion coefficient when an absolute value of the adjusted offset value at the first moment is less than a first threshold, to determine a first offset value of the target cursor control.

In some embodiments, because a value range of the adjusted offset value $X_t$ at the first moment is [−1,1], the first threshold may be set to 0.6, the first coordinate conversion coefficient coeffi1 is set to 10 (pixels), and then the first offset value rx1 of the target cursor control is determined according to coeffi1*$X'_t$.

In some embodiments, the unit in the target device coordinate system may be a pixel, that is, the movement unit of the first offset value rx1 is a pixel.

Step S32. Determine the first position of the target cursor control in the target device coordinate system at the first moment according to the second position and the first offset value of the target cursor control, the first coordinate conversion coefficient being negatively correlated with the preset frequency.

In some embodiments, assuming that the second position is $loca_{k-1}$, then the first position $loca_k$ of the target cursor control may be determined according to $rx1 + loca_{(k-1)}$.

In some embodiments, the second position may include a second horizontal position $loca_{x(k-1)}$ and a second vertical position $loca_{y(k-1)}$, the first offset value $r_{x1}$ may include a first target horizontal offset value $r_{x1}$ and a first target vertical offset value $r_{y1}$, and then a first horizontal position $loca_{xk}$ and a first vertical position $loca_{yk}$ may be determined through $r_{x1} + loca_{x(k-1)}$ and $r_{y1} + loca_{y(k-1)}$.

In the technical solution provided by this embodiment, the setting of the first threshold allows different adjusted offset values to correspond to different coordinate conversion coefficients, so that a movement speed of the target cursor control is positively correlated with a movement speed of the target stick.

Figure 9:
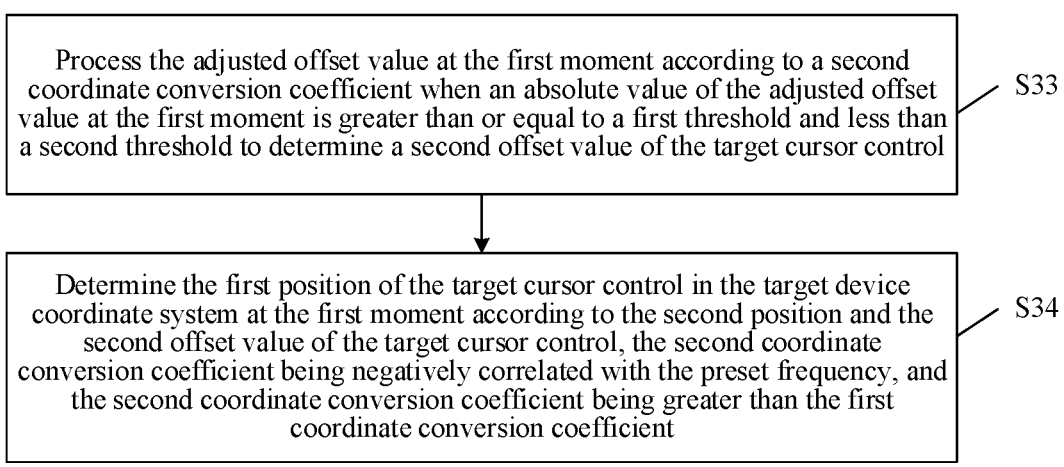
FIG. 9 is a flowchart of step S3 in FIG. 6 according to an exemplary embodiment.

FIG. 9 is a flowchart of step S3 in FIG. 6 according to an exemplary embodiment. Referring to FIG. 9, step S3 may include the following steps.

Step S33. Process the adjusted offset value at the first moment according to a second coordinate conversion coefficient when an absolute value of the adjusted offset value at the first moment is greater than or equal to a first threshold and less than a second threshold to determine a second offset value of the target cursor control.

In some embodiments, the second threshold may be set to 0.9, the second coordinate conversion coefficient coeffi2 may be set to 20 (pixels), and then the second offset value rx2 of the target cursor control may be determined according to coeffi2*$X'_t$.

Step S34. Determine the first position of the target cursor control in the target device coordinate system at the first moment according to the second position and the second offset value of the target cursor control, the second coordinate conversion coefficient being negatively correlated with the preset frequency, and the second coordinate conversion coefficient being greater than the first coordinate conversion coefficient.

In some embodiments, the second position may include a second horizontal position $loca_{x(k-1)}$ and a second vertical position $loca_{y(k-1)}$, the second offset value may include a second target horizontal offset value $r_{x2}$ and a second target vertical offset value $r_{y2}$, and then a first horizontal position $loca_{xk}$ and a first vertical position $loca_{yk}$ may be determined through $r_{x2} + loca_{x(k-1)}$ and $r_{x2} + loca_{y(k-1)}$.

In the technical solution provided by this embodiment, the setting of the first threshold and second threshold allows different adjusted offset values to correspond to different coordinate conversion coefficients, so that a movement speed of the target cursor control is positively correlated with a movement speed of the target stick.

Figure 10:
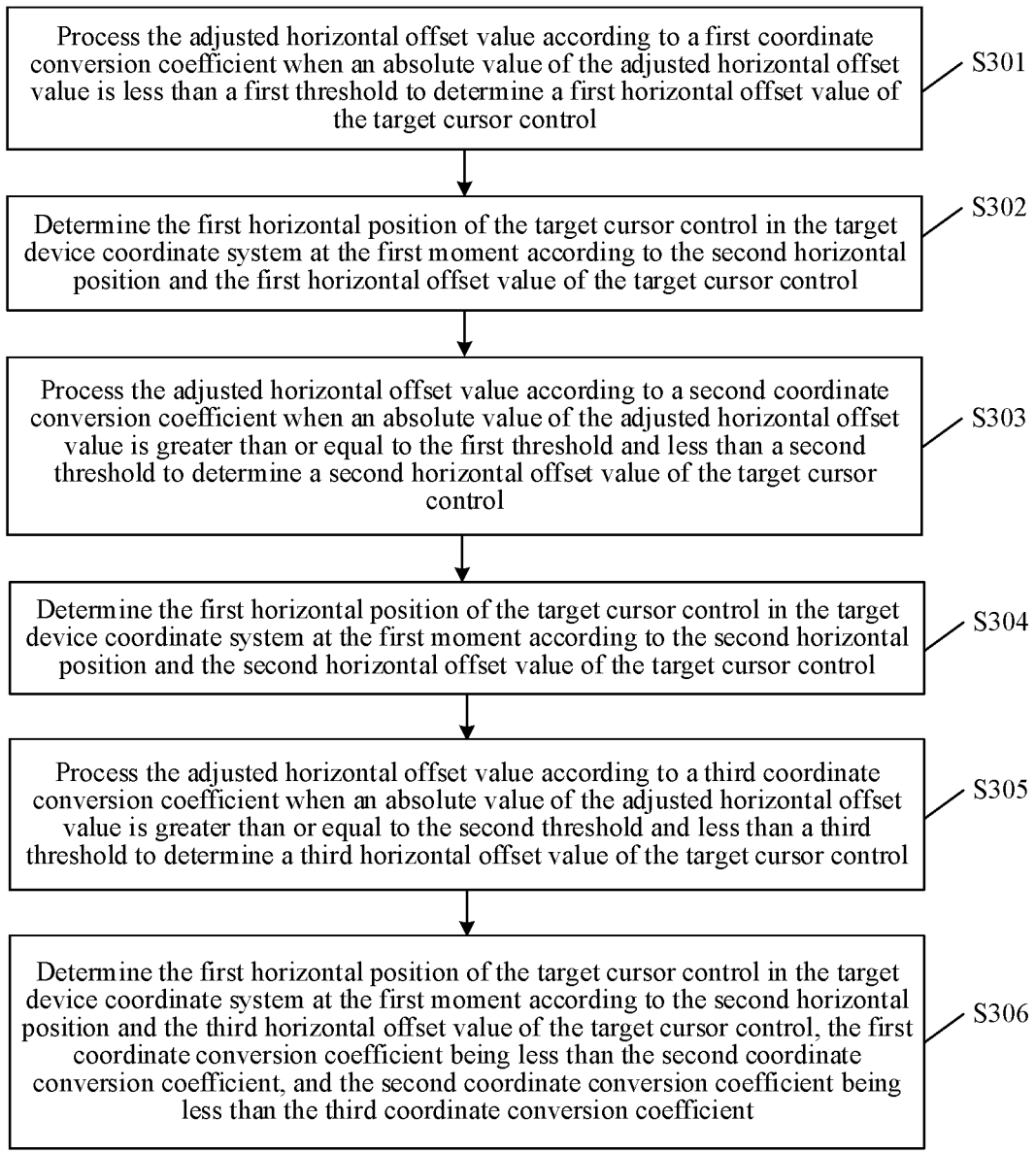
FIG. 10 is a flowchart of step S3 in FIG. 6 according to an exemplary embodiment.

FIG. 10 is a flowchart of step S3 in FIG. 6 according to an exemplary embodiment.

In some embodiments, the adjusted offset value at the first moment may include an adjusted horizontal offset value $X'_{xi}$ of the target stick in the stick coordinate system, the second position of the target cursor control includes the second horizontal position $loca_{x_{(k-1)}}$ of the target cursor control in the target device coordinate system, and the first position of the target cursor control includes the first horizontal position $loca_{xk}$ of the target cursor control in the target device coordinate system. Referring to FIG. 10, step S3 may include the following steps.

Step S301. Process the adjusted horizontal offset value according to a first coordinate conversion coefficient when an absolute value of the adjusted horizontal offset value is less than a first threshold to determine a first horizontal offset value of the target cursor control.

In some embodiments, the adjusted horizontal offset value $X'_{xi}$ may be processed according to the first coordinate conversion coefficient coeffi1 to determine the first horizontal offset value $rx_{x1}$ in combination with the formula coeffi1*$X'_{xi}$.

The first threshold may be set to 0.6, and the first coordinate conversion coefficient coeffi1 may be set to 10 pixels.

Step S302. Determine the first horizontal position of the target cursor control in the target device coordinate system at the first moment according to the second horizontal position and the first horizontal offset value of the target cursor control.

In some embodiments, assuming that the second horizontal position is $loca_{x_{(k-1)}}$, then the first horizontal position $loca_{xk}$ at the first moment may be determined through $rx_{x1}+loca_{x_{(k-1)}}$.

Step S303. Process the adjusted horizontal offset value according to a second coordinate conversion coefficient when an absolute value of the adjusted horizontal offset value is greater than or equal to the first threshold and less than a second threshold to determine a second horizontal offset value of the target cursor control.

In some embodiments, the adjusted horizontal offset value $X'_{xi}$ may be processed according to the second coordinate conversion coefficient coeffi2 to determine the second horizontal offset value $rx_{x2}$ in combination with the formula coeff2*$X'_{xi}$.

In some embodiments, the second threshold may be set to 0.9, and the second coordinate conversion coefficient coeffi2 may be set to 20 pixels.

Step S304. Determine the first horizontal position of the target cursor control in the target device coordinate system at the first moment according to the second horizontal position and the second horizontal offset value of the target cursor control.

In some embodiments, the first horizontal position $loca_{xk}$ at the first moment may be determined through $rx_{x2}+loca_{x_{(k-1)}}$.

Step S305. Process the adjusted horizontal offset value according to a third coordinate conversion coefficient when an absolute value of the adjusted horizontal offset value is greater than or equal to the second threshold and less than a third threshold to determine a third horizontal offset value of the target cursor control.

In some embodiments, the adjusted horizontal offset value $X'_{xi}$ may be processed according to the third coordinate conversion coefficient coeffi3 to determine the third horizontal offset value $rx_{x3}$ in combination with the formula coeff3*$X'_{xi}$.

In some embodiments, the third threshold may be set to 1, and the third coordinate conversion coefficient coeffi3 may be set to 30 pixels.

Step S306. Determine the first horizontal position of the target cursor control in the target device coordinate system at the first moment according to the second horizontal position and the third horizontal offset value of the target cursor control, the first coordinate conversion coefficient being less than the second coordinate conversion coefficient, and the second coordinate conversion coefficient being less than the third coordinate conversion coefficient. In other words, the multiple coordinate conversion coefficients, collectively, define a non-linear conversation relationship from the stick coordinate system to the target device coordinate system.

In some embodiments, the first horizontal position $loca_{xk}$ at the first moment may be determined through $rx_{x3}+loca_{x_{(k-1)}}$.

In the technical solution provided by this embodiment, the movement of the target cursor control in the horizontal coordinate direction of the target device coordinate system may be controlled according to the adjusted horizontal offset value. As a result, a movement speed of the target cursor control in the horizontal coordinate direction of the target device coordinate system is positively correlated with a movement speed of the target stick in the horizontal coordinate direction of the stick coordinate system.

Figure 11:
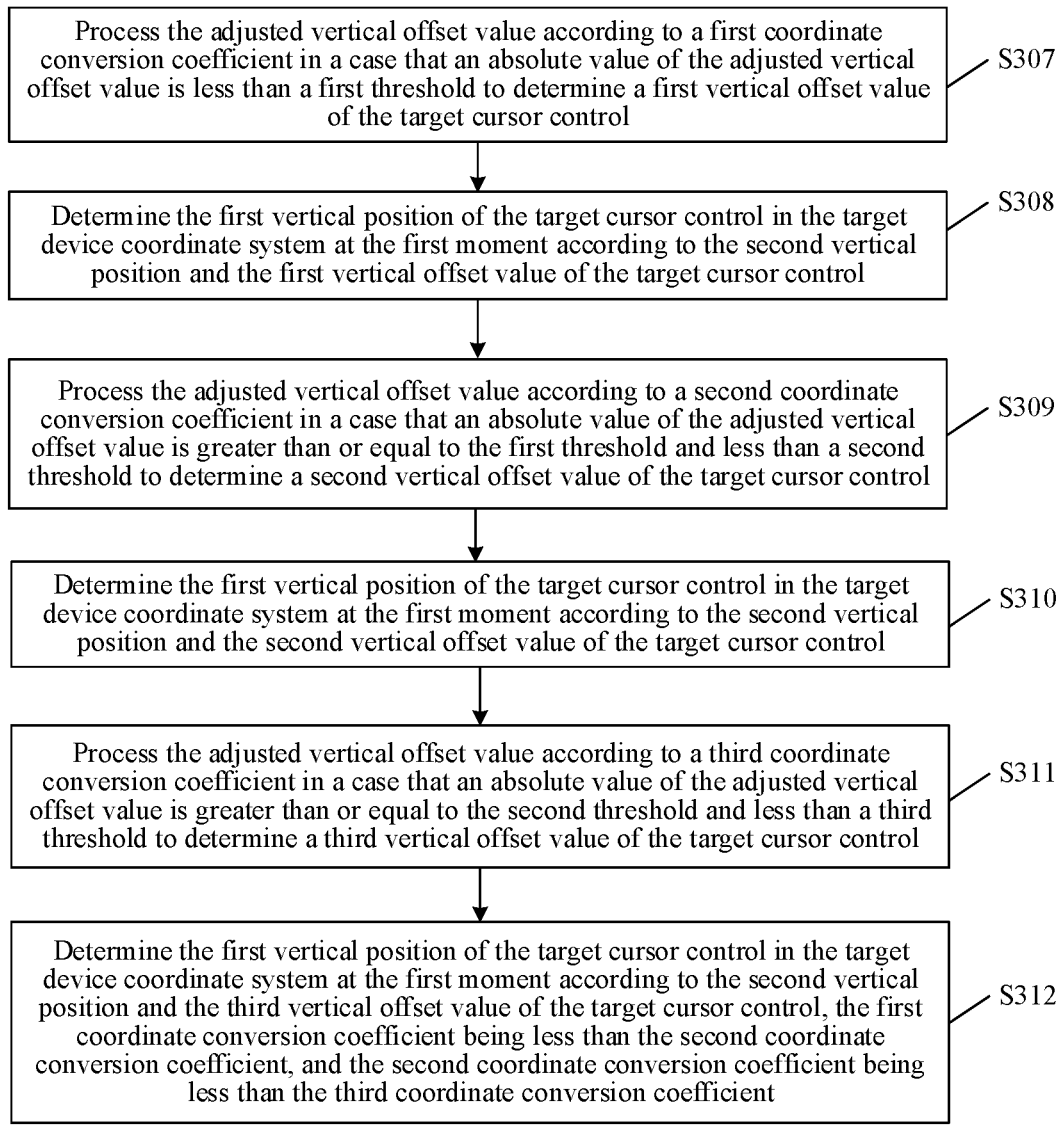
FIG. 11 is a flowchart of step S3 in FIG. 6 according to an exemplary embodiment.

FIG. 11 is a flowchart of step S3 in FIG. 6 according to an exemplary embodiment.

In some embodiments, the adjusted offset value at the first moment includes an adjusted vertical offset value $X'_{yi}$ of the target stick in the stick coordinate system, the second position includes a second vertical position $loca_{y_{(k-1)}}$ of the target cursor control in the target device coordinate system, and the first position includes a current vertical position $loca_{yk}$ of the target cursor control in the target device coordinate system. Referring to FIG. 11, step S3 may include the following steps.

Step S307. Process the adjusted vertical offset value according to a first coordinate conversion coefficient when an absolute value of the adjusted vertical offset value is less than a first threshold to determine a first vertical offset value of the target cursor control.

In some embodiments, the adjusted vertical offset value $X'_{yi}$ may be processed according to the first coordinate conversion coefficient coeffi1 to determine the first vertical offset value $rx_{y1}$ in combination with the formula coeffi1*$X'_{yi}$.

The first threshold may be set to 0.6, and the first coordinate conversion coefficient coeffi1 may be set to 10 pixels.

Step S308. Determine the first vertical position of the target cursor control in the target device coordinate system at the first moment according to the second vertical position and the first vertical offset value of the target cursor control.

In some embodiments, assuming that the second vertical position is $loca_{y_{(k-1)}}$, then the first vertical position $loca_{yk}$ at the first moment may be determined through $rx_{y1}+loca_{y_{(k-1)}}$.

Step S309. Process the adjusted vertical offset value according to a second coordinate conversion coefficient when an absolute value of the adjusted vertical offset value is greater than or equal to the first threshold and less than a second threshold to determine a second vertical offset value of the target cursor control.

In some embodiments, the adjusted vertical offset value $X'_{yi}$ may be processed according to the second coordinate conversion coefficient coeffi2 to determine the second vertical offset value $rx_{y2}$ in combination with the formula coeff2*$X'_{yi}$.

In some embodiments, the second threshold may be set to 0.9, and the second coordinate conversion coefficient coeffi2 may be set to 20 pixels.

Step S310. Determine the first vertical position of the target cursor control in the target device coordinate system at the first moment according to the second vertical position and the second vertical offset value of the target cursor control.

In some embodiments, the first vertical position $loca_{yk}$ at the first moment may be determined through $rx_{y2}+loca_{y(k-1)}$.

Step S311. Process the adjusted vertical offset value according to a third coordinate conversion coefficient when an absolute value of the adjusted vertical offset value is greater than or equal to the second threshold and less than a third threshold to determine a third vertical offset value of the target cursor control.

In some embodiments, the adjusted vertical offset value $X'_{yi}$ may be processed according to the third coordinate conversion coefficient coeffi3 to determine the third vertical offset value $rx_{y3}$ in combination with the formula coeff3*$X'_{yi}$.

In some embodiments, the third threshold may be set to 1, and the third coordinate conversion coefficient coeffi3 may be set to 30 pixels.

Step S312. Determine the first vertical position of the target cursor control in the target device coordinate system at the first moment according to the second vertical position and the third vertical offset value of the target cursor control, the first coordinate conversion coefficient being less than the second coordinate conversion coefficient, and the second coordinate conversion coefficient being less than the third coordinate conversion coefficient.

In some embodiments, the first vertical position located at the first moment may be determined through $rx_{y3}+loca_{y(k-1)}$.

In the technical solution provided by this embodiment, the movement of the target cursor control in the vertical coordinate direction of the target device coordinate system may be controlled according to the adjusted vertical offset value. As a result, a movement speed of the target cursor control in the vertical coordinate direction of the target device coordinate system is positively correlated with a movement speed of the target stick in the vertical coordinate direction of the stick coordinate system.

Figure 12:
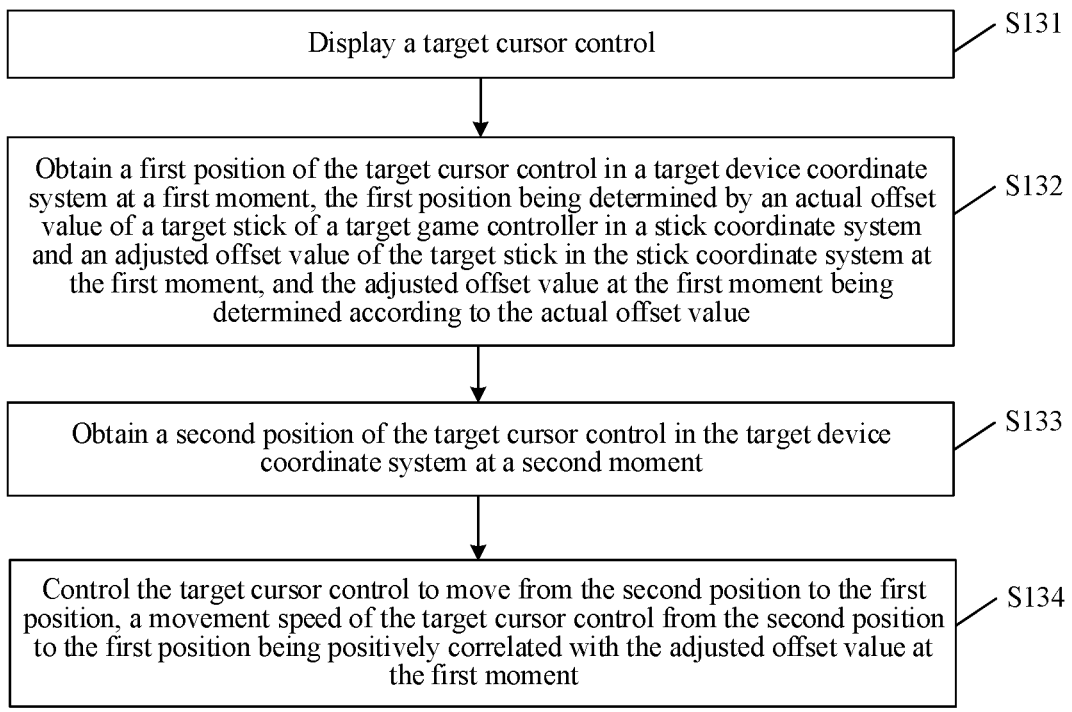
FIG. 12 is a flowchart of a method for controlling a cursor control according to an exemplary embodiment.

FIG. 12 is a flowchart of a method for controlling a cursor control according to an exemplary embodiment. Referring to FIG. 12, the method for controlling a cursor control may include the following steps.

Step S131. Display a target cursor control.

In some embodiments, the target cursor control may be displayed in the terminal device shown in FIG. 1.

Step S132. Obtain a first position of the target cursor control in a target device coordinate system at a first moment, the first position being determined by an actual offset value of a target stick of a game controller in an stick coordinate system and an adjusted offset value of the target stick in the stick coordinate system at the first moment, and the adjusted offset value at the first moment being determined according to the actual offset value.

Step S133. Obtain a second position of the target cursor control in the target device coordinate system at a second moment.

Step S134. Control the target cursor control to move from the second position to the first position, a movement speed of the target cursor control from the second position to the first position being positively correlated with the adjusted offset value at the first moment.

In the technical solution provided in the embodiment of the present disclosure, the first position of the target cursor control is determined through the adjusted offset value of the target stick in the stick coordinate system, and the target cursor control is controlled to move from the second position at the second moment to the first position, so that the movement speed of the target cursor control from the second position to the first position is positively correlated with the adjusted offset value at the first moment, that is, the movement speed of the target cursor control is positively correlated with the shaking speed of the target stick.

In some embodiments, the actual offset value of the target stick of the game controller in the stick coordinate system is an actual offset value corresponding to a moment closest to the first moment.

In some embodiments, if the target stick always maintains the maximum offset, that is, the adjusted offset value of the target stick in the stick coordinate system is a maximum adjusted offset value (that is, a current shaking range of the target stick is a maximum shaking range), and the actual offset value corresponding to the moment closest to the first moment is a maximum actual offset value, the target cursor control may be controlled to move from the second position to the first position at a maximum movement speed through the technical solution provided in this embodiment. It can be understood that, in this embodiment, the maximum adjusted offset value, the maximum actual offset value, and the maximum speed may be preset. This is not limited in the present disclosure.

Figure 13:
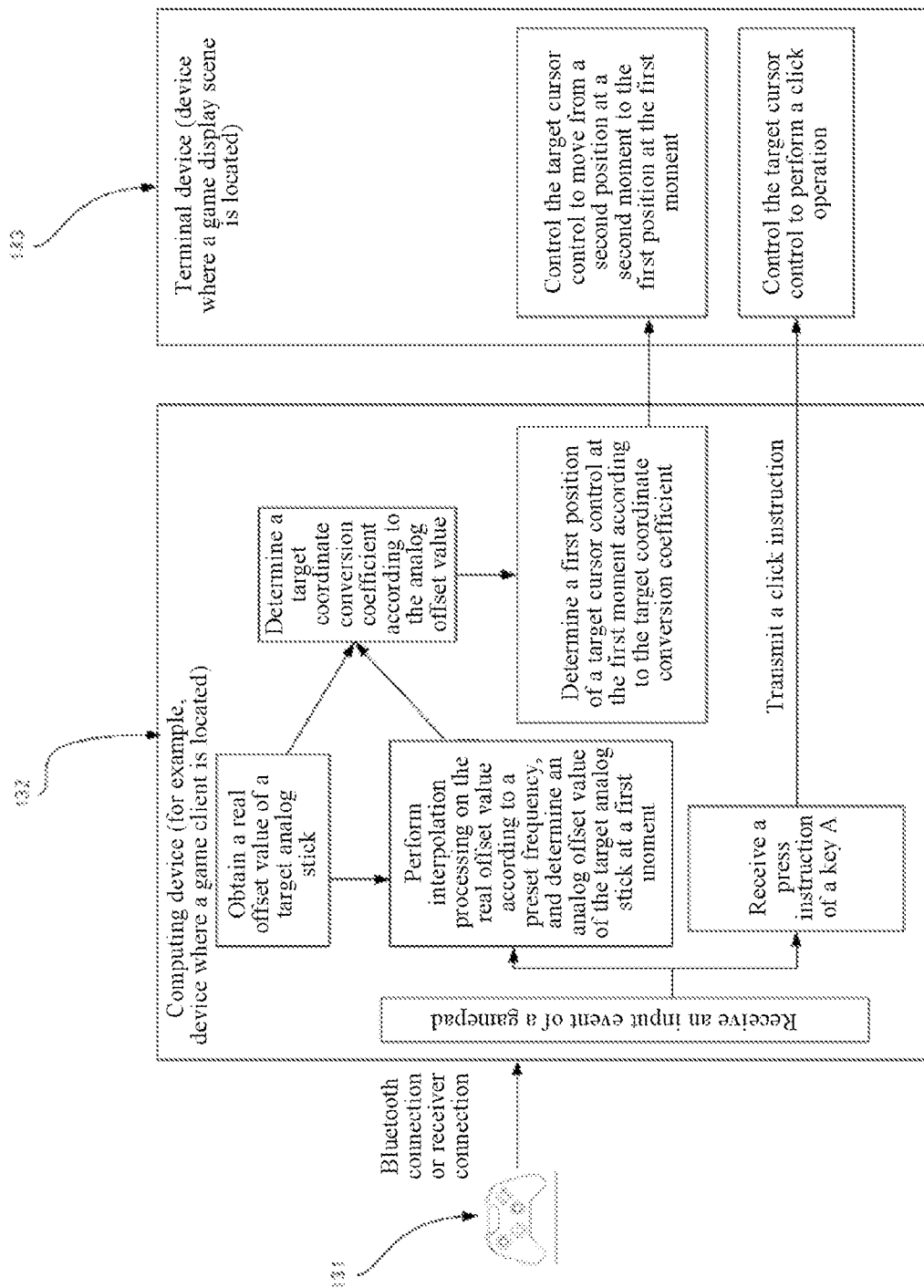
FIG. 13 is a schematic diagram of a system for controlling a cursor control according to an exemplary embodiment.

FIG. 13 is a schematic diagram of a system for controlling a cursor control according to an exemplary embodiment. Referring to FIG. 13, the system for controlling a cursor control includes a game controller 131, a computing device 132, and a terminal device 133.

The game controller 131 may be used to control a target cursor control in the terminal device 133.

In some embodiments, the control of the target cursor control by the system for controlling a cursor control may include the following steps:

The game controller 131 is connected to the computing device 132 through a Bluetooth or a USB receiver, and transmits signals through the connection; the computing device 132 may receive an input event (such as a shaking time of a target stick or a press instruction of a key A, which is not limited in the present disclosure) transmitted by the game controller, when the input event of the game controller is that the target stick is shaken, the computing device 132 determines an actual offset value of the target stick according to data transmitted by the game controller; the computing device 132 performs interpolation processing on the actual offset value according to a preset frequency to determine an adjusted offset value of the target stick at a first moment; the computing device 132 determines a target coordinate conversion coefficient according to the adjusted offset value (for example, when the adjusted offset value is less than or equal to 0.6, the target coordinate conversion coefficient is 10 pixels; when the adjusted offset value is greater than 0.6 and less than or equal to 0.9, the target coordinate conversion coefficient is 20 pixels; and when the adjusted offset value is greater than 0.9 and less than or equal to 1, the target coordinate conversion coefficient is 30 pixels); the computing device 132 determines a first position of the target cursor control at the first moment according to the target coordinate conversion coefficient, and transmits the first position of the target cursor control at the first moment to the terminal device 133; and the terminal device 133 controls the target cursor control to move from a second position at a second moment to the first position at the first moment, a movement speed of the target cursor control from the second position to the first position being positively correlated with the adjusted offset value at the first moment.

When the input event of the game controller is an event of pressing the key A, the computing device 132 converts the received press instruction into a click instruction, and transmits the click instruction to the terminal device 133, for the terminal device 133 to control the target cursor control to perform a click operation.

By using the system for controlling a cursor control provided in this embodiment, the adjusted offset value of the target stick is determined by the actual offset value of the target stick, and then the target cursor control is controlled to move at different speeds according to different adjusted offset values. The system provided in this embodiment ensures that a movement speed of the target cursor control is positively correlated with a movement speed of the target stick, and can not only control the movement speed of the target cursor control through the target stick, but also control the movement precision of the target cursor control through the target stick, thereby improving the user experience.

In some embodiments, the computing device 132 in the embodiment of FIG. 13 may be a device where a target cloud gaming client is located.

In some embodiments, the control of the target cursor control by the system for controlling a cursor control may include the following steps:

An application client of a target cloud game is installed on the computing device 132; a user enters an application lobby, runs the client of the target cloud game, and enters a scene of the target cloud game to start the target cloud game; the game controller 131 is connected to a device monitoring module of the client of the cloud game through a Bluetooth or a USB wireless receiver; during the running of the target cloud game, that is, during the display of the scene of the target cloud game, a target operation key of the game controller may be pressed and immediately released to switch the game mode for the game controller 131 to control the target cursor control in the target cloud game; the computing device 132 may receive an input event (such as a shaking time of a target stick or a press instruction of a key A, which is not limited in the present disclosure) transmitted by the game controller, when the input event of the game controller is that the target stick is shaken, the computing device 132 determines an actual offset value of the target stick according to data transmitted by the game controller; the computing device 132 samples the actual offset value according to a fixed time to determine an adjusted offset value of the target stick at a first moment; the computing device 132 determines a target coordinate conversion coefficient according to the adjusted offset value (for example, when the adjusted offset value is less than or equal to 0.6, the target coordinate conversion coefficient is 10 pixels; when the adjusted offset value is greater than 0.6 and less than or equal to 0.9, the target coordinate conversion coefficient is 20 pixels; and when the adjusted offset value is greater than 0.9 and less than or equal to 1, the target coordinate conversion coefficient is 30 pixels); the computing device 132 determines a first position of the target cursor control at the first moment according to the target coordinate conversion coefficient, and transmits the first position of the target cursor control at the first moment to the terminal device 133; and the terminal device 133 controls the target cursor control to move from a second position at a second moment to the first position at the first moment, a movement speed of the target cursor control from the second position to the first position being positively correlated with the adjusted offset value at the first moment.

When the input event of the game controller is an event of pressing the key A, the computing device 132 converts the received press instruction into a click instruction, and transmits the click instruction to the terminal device 133, for the terminal device 133 to control the target cursor control to perform a click operation.

The control of the target cursor control in the target cloud game can be achieved through the foregoing steps.

Figure 14:
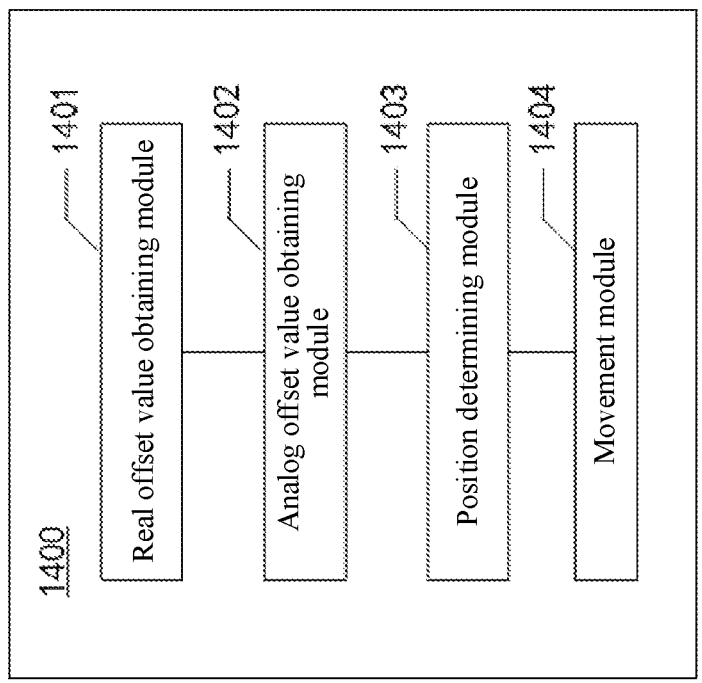
FIG. 14 is a block diagram of an apparatus for controlling a cursor control according to an exemplary embodiment.

FIG. 14 is a block diagram of an apparatus for controlling a cursor control according to an exemplary embodiment. Referring to FIG. 14, an apparatus 1400 for controlling a cursor control provided in this embodiment of the present disclosure may include: an actual offset value obtaining module 1401, an adjusted offset value obtaining module 1402, a position determining module 1403, and a movement module 1404.

The actual offset value obtaining module 1401 may be configured to obtain an actual offset value of a target stick in an stick coordinate system from a game controller, the game controller being used for controlling a target cursor control in a target device. The adjusted offset value obtaining module 1402 may be configured to determine an adjusted offset value of the target stick in the stick coordinate system at a first moment according to the actual offset value. The position determining module 1403 may be configured to determine a first position of the target cursor control in a target device coordinate system at the first moment according to the adjusted offset value at the first moment. The movement module 1404 may be configured to transmit the first position to the target device to control the target cursor control to move from a second position in the target device coordinate system at a second moment to the first position, the second moment being a moment before the first moment, a movement speed of the target cursor control from the second position to the first position being positively correlated with the adjusted offset value at the first moment.

In some embodiments, the adjusted offset value obtaining module 1402 may include: an interpolation submodule.

The interpolation submodule may be configured to perform interpolation processing on the actual offset value according to a preset frequency to determine the adjusted offset value of the target stick in the stick coordinate system at the first moment.

In some embodiments, the interpolation submodule may include: a first target actual offset value obtaining unit, an adjusted offset value obtaining unit, and a first interpolation unit.

The first target actual offset value obtaining unit may be configured to obtain a first target actual offset value corresponding to a moment closest to the first moment from the actual offset value. The adjusted offset value obtaining unit may be configured to obtain an adjusted offset value of the target stick in the stick coordinate system at the second moment. The first interpolation unit may be configured to determine the adjusted offset value of the target stick in the stick coordinate system at the first moment according to the first target actual offset value and the adjusted offset value at the second moment.

In some embodiments, the interpolation submodule may include: a second interpolation unit.

The second interpolation unit may be configured to obtain a second target actual offset value corresponding to a moment closest to the first moment from the actual offset value as the adjusted offset value of the target stick in the stick coordinate system at the first moment.

In some embodiments, the position determining module 1403 may include: a first determining submodule and a first position determining submodule.

The first determining submodule may be configured to process the adjusted offset value at the first moment according to a first coordinate conversion coefficient when an absolute value of the adjusted offset value at the first moment is less than a first threshold, and determine a first offset value of the target cursor control. The first position determining submodule may be configured to determine the first position of the target cursor control in the target device coordinate system at the first moment according to the second position and the first offset value of the target cursor control. The first coordinate conversion coefficient is negatively correlated with the preset frequency.

In some embodiments, the position determining module 1403 may also include: a second determining submodule and a second position determining submodule.

The second determining submodule may be configured to process the adjusted offset value at the first moment according to a second coordinate conversion coefficient when an absolute value of the adjusted offset value at the first moment is greater than or equal to a first threshold and less than a second threshold, and determine a second offset value of the target cursor control. The second position determining submodule may be configured to determine the first position of the target cursor control in the target device coordinate system at the first moment according to the second position and the second offset value. The second coordinate conversion coefficient is negatively correlated with the preset frequency, the second coordinate conversion coefficient is greater than a first coordinate conversion coefficient, and the first coordinate conversion coefficient is a coordinate conversion coefficient used when the absolute value of the adjusted offset value at the first moment is less than the first threshold.

In some embodiments, the adjusted offset value includes an adjusted horizontal offset value of the target stick in the stick coordinate system, the second position includes a second horizontal position of the target cursor control in the target device coordinate system, and the first position includes a first horizontal position of the target cursor control in the target device coordinate system.

In some embodiments, the position determining module 1403 may include: a third determining submodule, a third position determining submodule, a fourth determining submodule, a fourth position determining submodule, a fifth determining submodule, and a fifth position determining submodule.

The third determining submodule may be configured to process the adjusted horizontal offset value according to a first coordinate conversion coefficient when an absolute value of the adjusted horizontal offset value is less than a first threshold to determine a first horizontal offset value of the target cursor control. The third determining submodule may be configured to process the adjusted horizontal offset value according to a first coordinate conversion coefficient when an absolute value of the adjusted horizontal offset value is less than a first threshold, and determine a first horizontal offset value of the target cursor control. The third position determining submodule may be configured to determine the first horizontal position of the target cursor control in the target device coordinate system at the first moment according to the second horizontal position and the first horizontal offset value of the target cursor control. The fourth determining submodule may be configured to process the adjusted horizontal offset value according to a second coordinate conversion coefficient when an absolute value of the adjusted horizontal offset value is greater than or equal to the first threshold and less than a second threshold to determine a second horizontal offset value of the target cursor control. The fourth position determining submodule may be configured to determine the first horizontal position of the target cursor control in the target device coordinate system at the first moment according to the second horizontal position and the second horizontal offset value of the target cursor control. The fifth determining submodule may be configured to process the adjusted horizontal offset value according to a third coordinate conversion coefficient when an absolute value of the adjusted horizontal offset value is greater than or equal to the second threshold and less than a third threshold, and determine a third horizontal offset value of the target cursor control. The fifth position determining submodule may be configured to determine the first horizontal position of the target cursor control in the target device coordinate system at the first moment according to the second horizontal position and the third horizontal offset value of the target cursor control. The first coordinate conversion coefficient is less than the second coordinate conversion coefficient, and the second coordinate conversion coefficient is less than the third coordinate conversion coefficient.

In some embodiments, the adjusted offset value includes an adjusted vertical offset value of the target stick in the stick coordinate system, the second position includes a second vertical position of the target cursor control in the target device coordinate system, and the first position includes a first vertical position of the target cursor control in the target device coordinate system.

In some embodiments, the position determining module 1403 may also include: a sixth determining submodule, a sixth position determining submodule, a seventh determining submodule, a seventh position determining submodule, an eighth determining submodule, and an eighth position determining submodule.

The sixth determining submodule may be configured to process the adjusted vertical offset value according to a first coordinate conversion coefficient when an absolute value of the adjusted vertical offset value is less than a first threshold to determine a first vertical offset value of the target cursor control. The sixth determining submodule may be configured to process the adjusted vertical offset value according to a first coordinate conversion coefficient when an absolute value of the adjusted vertical offset value is less than a first threshold, and determine a first vertical offset value of the target cursor control. The sixth position determining submodule may be configured to determine the first vertical position of the target cursor control in the target device coordinate system at the first moment according to the second vertical position and the first vertical offset value of the target cursor control. The seventh determining submodule may be configured to process the adjusted vertical offset value according to a second coordinate conversion coefficient when an absolute value of the adjusted vertical offset value is greater than or equal to the first threshold and less than a second threshold, and determine a second vertical offset value of the target cursor control. The seventh position determining submodule may be configured to determine the first vertical position of the target cursor control in the target device coordinate system at the first moment according to the second vertical position and the second vertical offset value of the target cursor control. The eighth determining submodule may be configured to process the adjusted vertical offset value according to a third coordinate conversion coefficient when an absolute value of the adjusted vertical offset value is greater than or equal to the second threshold and less than a third threshold, and determine a third vertical offset value of the target cursor control. The eighth position determining submodule may be configured to determine the first vertical position of the target cursor control in the target device coordinate system at the first moment according to the second vertical position and the third vertical offset value of the target cursor control. The first coordinate conversion coefficient is less than the second coordinate conversion coefficient, and the second coordinate conversion coefficient is less than the third coordinate conversion coefficient. In other words, the multiple coordinate conversion coefficients, collectively, define a non-linear conversation relationship from the stick coordinate system to the target device coordinate system.

Because the functional modules of the apparatus 1400 for controlling a cursor control in the exemplary embodiment of the present disclosure correspond to the steps of the method for controlling a cursor control in the foregoing exemplary embodiment, details are not described herein again.

Figure 15:
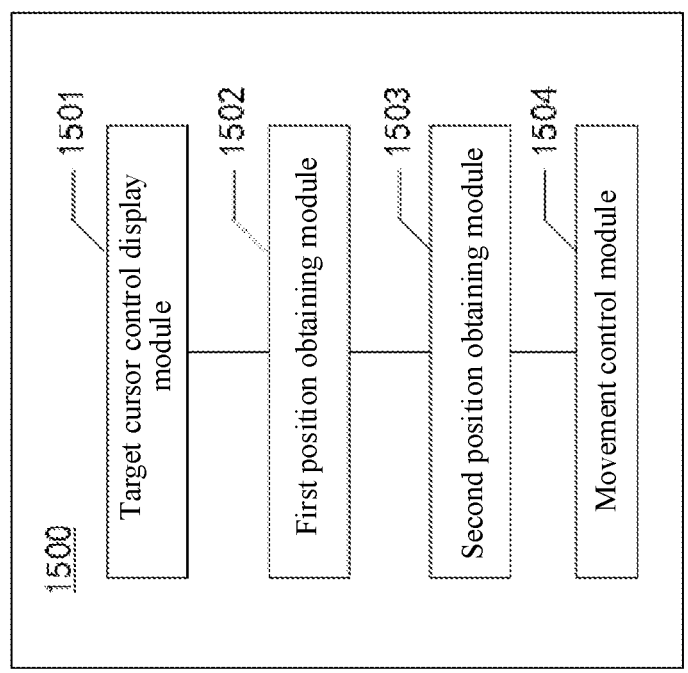
FIG. 15 is a block diagram of an apparatus for controlling a cursor control according to an exemplary embodiment.

FIG. 15 is a block diagram of an apparatus for controlling a cursor control according to an exemplary embodiment. Referring to FIG. 15, an apparatus 1500 for controlling a cursor control provided in this embodiment of the present disclosure may include: a target cursor control display module 1501, a first position obtaining module 1502, a second position obtaining module 1503, and a movement control module 1504.

The target cursor control display module 1501 may be configured to display a target cursor control. The first position obtaining module 1502 may be configured to obtain a first position of the target cursor control in a target device coordinate system at a first moment, the first position being determined by an actual offset value of a target stick of a game controller in an stick coordinate system and an adjusted offset value of the target stick in the stick coordinate system at the first moment, and the adjusted offset value at the first moment being determined according to the actual offset value. The second position obtaining module 1503 may be configured to obtain a second position of the target cursor control in the target device coordinate system at a second moment. The movement control module 1504 may be configured to control the target cursor control to move from the second position to the first position, a movement speed of the target cursor control from the second position to the first position being positively correlated with the adjusted offset value at the first moment.

In some embodiments, the actual offset value of the target stick of the game controller in the stick coordinate system is an actual offset value corresponding to a moment closest to the first moment.

In some embodiments, the adjusted offset value of the target stick in the stick coordinate system is a maximum adjusted offset value, and the actual offset value corresponding to the moment closest to the first moment is a maximum actual offset value.

In some embodiments, the movement control module 1504 may also be configured to control the target cursor control to move from the second position to the first position at a maximum movement speed.

Because the functional modules of the apparatus 1500 for controlling a cursor control in the exemplary embodiment of the present disclosure correspond to the steps of the method for controlling a cursor control in the foregoing exemplary embodiment, details are not described herein again. For example, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

According to the foregoing descriptions of the implementations, a person skilled in the art may readily understand that the exemplary implementations described herein may be implemented by using software, or may be implemented by combining software and necessary hardware. Therefore, the technical solution of the embodiments of the present disclosure may be embodied in the form of a software product. The software product may be stored in a non-volatile storage medium (which may be a CD-ROM, a USB flash drive, a removable hard disk, and the like), including several instructions to enable a computing device (which may be a personal computer, a server, a mobile terminal, a smart device, or the like) to perform the method according to the embodiments of the present disclosure, for example, one or more steps shown in FIG. 5.

In addition, the foregoing accompanying drawings are only schematic illustrations of the processes included in the method according to exemplary embodiments of the present disclosure, and are not intended to be limiting. It is easily understood that the processes illustrated in the foregoing accompanying drawings do not indicate or define the chronological order of these processes. In addition, it is also easily understood that these processes may be performed, for example, synchronously or asynchronously in a plurality of modules.

A person skilled in the art may readily contemplate other embodiments of the present disclosure after considering the specification and practicing the disclosure disclosed herein. The present disclosure is intended to cover any variation, use, or adaptive change of the present disclosure. These variations, uses, or adaptive changes follow the general principles of the present disclosure and include common general knowledge or common technical means, which are not disclosed in the present disclosure, in the technology. The specification and the embodiments are merely for an illustration purpose, and the true scope and spirit of the present disclosure are subject to the claims.

It is to be understood that, the present disclosure is not limited to the detailed structures, accompanying drawings, or implementation methods described herein. On the contrary, the present disclosure is intended to cover various modifications and equivalent configurations within the spirit and scope of the appended claims.

What is claimed is:

1. A method for controlling a target cursor control on a display, performed by an electronic device, wherein the electronic device is communicatively connected to the display and a game controller, respectively, the method comprising:
   obtaining, from the game controller, an actual offset value of a target stick in a stick coordinate system associated with the game controller;
   determining an adjusted offset value of the target stick in the stick coordinate system at a first moment according to the actual offset value, further including:
   performing interpolation on the actual offset value based on respective offset values at a moment closest to the first moment and at a second moment according to a preset frequency to obtain an interpolated actual offset value, the second moment being a moment before the first moment; and determining the adjusted offset value of the target stick in the stick coordinate system at the first moment according to the interpolated actual offset value;

determining a first position of the target cursor control in a target device coordinate system associated with the display at the first moment according to the adjusted offset value of the target stick in the stick coordinate system at the first moment; and controlling the target cursor control to move from a second position in the target device coordinate system at a second moment to the first position, a movement speed of the target cursor control from the second position to the first position being positively correlated with the adjusted offset value of the target stick in the stick coordinate system at the first moment.

2. The method according to claim 1, wherein the determining the adjusted offset value of the target stick in the stick coordinate system at the first moment according to the interpolated actual offset value comprises:

obtaining a first target actual offset value corresponding to a moment closest to the first moment from the actual offset value;

obtaining an adjusted offset value of the target stick in the stick coordinate system at the second moment; and determining the adjusted offset value of the target stick in the stick coordinate system at the first moment according to the first target actual offset value and the adjusted offset value at the second moment.

3. The method according to claim 1, wherein the determining the adjusted offset value of the target stick in the stick coordinate system at the first moment according to the interpolated actual offset value comprises:

obtaining a second target actual offset value corresponding to a moment closest to the first moment from the actual offset value as the adjusted offset value of the target stick in the stick coordinate system at the first moment.

4. The method according to claim 1, wherein the determining the adjusted offset value of the target stick in the stick coordinate system at the first moment according to the interpolated actual offset value comprises:

processing the adjusted offset value at the first moment according to a first coordinate conversion coefficient when an absolute value of the adjusted offset value at the first moment is less than a first threshold, and determining a first offset value of the target cursor control; and determining the first position of the target cursor control in the target device coordinate system at the first moment according to the second position and the first offset value, wherein the first coordinate conversion coefficient is negatively correlated with the preset frequency.

5. The method according to claim 1, wherein the determining a first position of the target cursor control in a target device coordinate system associated with the display at the first moment according to the adjusted offset value of the target stick in the stick coordinate system at the first moment further comprises:

processing the adjusted offset value at the first moment according to a second coordinate conversion coefficient when an absolute value of the adjusted offset value at the first moment is greater than or equal to a first threshold and less than a second threshold, and determining a second offset value of the target cursor control; and determining the first position of the target cursor control in the target device coordinate system at the first moment according to the second position and the second offset value, wherein the second coordinate conversion coefficient is negatively correlated with the preset frequency, the second coordinate conversion coefficient is greater than a first coordinate conversion coefficient, and the first coordinate conversion coefficient is a coordinate conversion coefficient used when the absolute value of the adjusted offset value at the first moment is less than the first threshold.

6. The method according to claim 1, wherein the adjusted offset value of the target stick in the stick coordinate system is a maximum adjusted offset value, and the actual offset value corresponding to the moment closest to the first moment is a maximum actual offset value; and the controlling the target cursor control to move from a second position in the target device coordinate system at a second moment to the first position comprises:

controlling the target cursor control to move from the second position to the first position at a maximum movement speed.

7. An electronic device, wherein the electronic device is communicatively connected to a display and a game controller, respectively, the electronic device comprising:

one or more processors; and a storage apparatus, configured to store one or more programs, the one or more programs, when executed by the one or more processors, causing the electronic device to perform a method for controlling a target cursor control on the display including:

obtaining, from the game controller, an actual offset value of a target stick in a stick coordinate system associated with the game controller;

determining an adjusted offset value of the target stick in the stick coordinate system at a first moment according to the actual offset value, further including:

performing interpolation on the actual offset value based on respective offset values at a moment closest to the first moment and at a second moment according to a preset frequency to obtain an interpolated actual offset value, the second moment being a moment before the first moment; and determining the adjusted offset value of the target stick in the stick coordinate system at the first moment according to the interpolated actual offset value;

determining a first position of the target cursor control in a target device coordinate system associated with the display at the first moment according to the adjusted offset value of the target stick in the stick coordinate system at the first moment; and controlling the target cursor control to move from a second position in the target device coordinate system at a second moment to the first position, a movement speed of the target cursor control from the second position to the first position being positively correlated with the adjusted offset value of the target stick in the stick coordinate system at the first moment.

8. The electronic device according to claim 7, wherein the determining the adjusted offset value of the target stick in the stick coordinate system at the first moment according to the interpolated actual offset value comprises:

obtaining a first target actual offset value corresponding to a moment closest to the first moment from the actual offset value;
obtaining an adjusted offset value of the target stick in the stick coordinate system at the second moment; and
determining the adjusted offset value of the target stick in the stick coordinate system at the first moment according to the first target actual offset value and the adjusted offset value at the second moment.

9. The electronic device according to claim 7, wherein the determining the adjusted offset value of the target stick in stick coordinate system at the first moment according to the interpolated actual offset value comprises:
obtaining a second target actual offset value corresponding to a moment closest to the first moment from the actual offset value as the adjusted offset value of the target stick in the stick coordinate system at the first moment.

10. The electronic device according to claim 7, wherein the determining the adjusted offset value of the target stick in the stick coordinate system at the first moment according to the interpolated actual offset value comprises:
processing the adjusted offset value at the first moment according to a first coordinate conversion coefficient when an absolute value of the adjusted offset value at the first moment is less than a first threshold, and determining a first offset value of the target cursor control; and
determining the first position of the target cursor control in the target device coordinate system at the first moment according to the second position and the first offset value,
wherein the first coordinate conversion coefficient is negatively correlated with the preset frequency.

11. The electronic device according to claim 7, wherein the determining a first position of the target cursor control in a target device coordinate system associated with the display at the first moment according to the adjusted offset value of the target stick in the stick coordinate system at the first moment further comprises:
processing the adjusted offset value at the first moment according to a second coordinate conversion coefficient when an absolute value of the adjusted offset value at the first moment is greater than or equal to a first threshold and less than a second threshold, and determining a second offset value of the target cursor control; and
determining the first position of the target cursor control in the target device coordinate system at the first moment according to the second position and the second offset value,
wherein the second coordinate conversion coefficient is negatively correlated with the preset frequency, the second coordinate conversion coefficient is greater than a first coordinate conversion coefficient, and the first coordinate conversion coefficient is a coordinate conversion coefficient used when the absolute value of the adjusted offset value at the first moment is less than the first threshold.

12. The electronic device according to claim 7, wherein the adjusted offset value of the target stick in the stick coordinate system is a maximum adjusted offset value, and the actual offset value corresponding to the moment closest to the first moment is a maximum actual offset value; and the controlling the target cursor control to move from a second position in the target device coordinate system at a second moment to the first position comprises:
controlling the target cursor control to move from the second position to the first position at a maximum movement speed.

13. A non-transitory computer-readable storage medium, storing one or more computer programs, the computer programs, when executed by a processor of an electronic device that is communicatively connected to a display and a game controller, respectively, causing the electronic device to perform a method for controlling a target cursor control on the display including:
obtaining, from the game controller, an actual offset value of a target stick in a stick coordinate system associated with the game controller;
determining an adjusted offset value of the target stick in the stick coordinate system at a first moment according to the actual offset value, further including:
performing interpolation on the actual offset value based on respective offset values at a moment closest to the first moment and at a second moment according to a preset frequency to obtain an interpolated actual offset value, the second moment being a moment before the first moment; and
determining the adjusted offset value of the target stick in the stick coordinate system at the first moment according to the interpolated actual offset value;
determining a first position of the target cursor control in a target device coordinate system associated with the display at the first moment according to the adjusted offset value of the target stick in the stick coordinate system at the first moment; and
controlling the target cursor control to move from a second position in the target device coordinate system at a second moment to the first position,
a movement speed of the target cursor control from the second position to the first position being positively correlated with the adjusted offset value of the target stick in the stick coordinate system at the first moment.

14. The non-transitory computer-readable storage medium according to claim 13, wherein the determining the adjusted offset value of the target stick in the stick coordinate system at the first moment according to the interpolated actual offset value comprises:
obtaining a first target actual offset value corresponding to a moment closest to the first moment from the actual offset value;
obtaining an adjusted offset value of the target stick in the stick coordinate system at the second moment; and
determining the adjusted offset value of the target stick in the stick coordinate system at the first moment according to the first target actual offset value and the adjusted offset value at the second moment.

15. The non-transitory computer-readable storage medium according to claim 13, wherein the determining the adjusted offset value of the target stick in the stick coordinate system at the first moment according to the interpolated actual offset value comprises:
obtaining a second target actual offset value corresponding to a moment closest to the first moment from the actual offset value as the adjusted offset value of the target stick in the stick coordinate system at the first moment.

16. The non-transitory computer-readable storage medium according to claim 13, wherein the determining the adjusted offset value of the target stick in the stick coordinate system at the first moment according to the interpolated actual offset value comprises:

processing the adjusted offset value at the first moment according to a first coordinate conversion coefficient when an absolute value of the adjusted offset value at the first moment is less than a first threshold, and determining a first offset value of the target cursor control; and determining the first position of the target cursor control in the target device coordinate system at the first moment according to the second position and the first offset value, wherein the first coordinate conversion coefficient is negatively correlated with the preset frequency.

17. The non-transitory computer-readable storage medium according to claim 13, wherein the determining a first position of the target cursor control in a target device coordinate system associated with the display at the first moment according to the adjusted offset value of the target stick in the stick coordinate system at the first moment further comprises:

processing the adjusted offset value at the first moment according to a second coordinate conversion coefficient when an absolute value of the adjusted offset value at the first moment is greater than or equal to a first threshold and less than a second threshold, and determining a second offset value of the target cursor control; and determining the first position of the target cursor control in the target device coordinate system at the first moment according to the second position and the second offset value, wherein the second coordinate conversion coefficient is negatively correlated with the preset frequency, the second coordinate conversion coefficient is greater than a first coordinate conversion coefficient, and the first coordinate conversion coefficient is a coordinate conversion coefficient used when the absolute value of the adjusted offset value at the first moment is less than the first threshold.

* * * * *